US008370122B2

(12) United States Patent
Walker et al.

(10) Patent No.: US 8,370,122 B2
(45) Date of Patent: Feb. 5, 2013

(54) METHOD OF PREDICTING CONNECTIVITY BETWEEN PARTS OF A POTENTIAL HYDROCARBON RESERVOIR AND ANALYZING 3D DATA IN A SUBSURFACE REGION

(75) Inventors: Kelly G. Walker, Sugar Land, TX (US); Timothy A. Chartrand, Spring, TX (US); Paul A. Dunn, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 258 days.

(21) Appl. No.: 12/738,018

(22) PCT Filed: Nov. 13, 2008

(86) PCT No.: PCT/US2008/083413
§ 371 (c)(1),
(2), (4) Date: Apr. 14, 2010

(87) PCT Pub. No.: WO2009/082563
PCT Pub. Date: Jul. 2, 2009

(65) Prior Publication Data
US 2010/0274543 A1 Oct. 28, 2010

Related U.S. Application Data

(60) Provisional application No. 61/008,757, filed on Dec. 21, 2007.

(51) Int. Cl.
*G06G 7/48* (2006.01)
(52) U.S. Cl. ........................................................ 703/10
(58) Field of Classification Search ................ 703/6, 10; 702/14–16
See application file for complete search history.

(56) References Cited

U.S. PATENT DOCUMENTS

| 4,751,643 | A | 6/1988 | Lorensen et al. |
| 4,809,240 | A | 2/1989 | Mufti |
| 4,972,383 | A | 11/1990 | Lailly |

(Continued)

FOREIGN PATENT DOCUMENTS

| GB | 2145508 | 3/1985 |
| WO | WO 2004/029715 | 8/2004 |

(Continued)

OTHER PUBLICATIONS

Ainsworth, R.B., (2005) "Sequence Stratigraphic-Based Analysis Of Depositional Architecture—A Case Study From A Marginal Marine Depositional Setting," *Petro. Geoscience*, v. 11, pp. 257-276.

(Continued)

*Primary Examiner* — Mary C Jacob
*Assistant Examiner* — Aniss Chad
(74) *Attorney, Agent, or Firm* — ExxonMobil Upstream Research Company Law Department

(57) ABSTRACT

A method and apparatus for segmenting geobodies extracted from three-dimensional geophysical survey data volumes. In one embodiment, the invention involves (a) obtaining a plurality of data elements, respectively corresponding to three-dimensional locations in a subsurface region, and generating a data volume consisting of discrete cells from the plurality of data elements (1); (b) identifying an initial geobody corresponding to a potential hydrocarbon reservoir within the data volume by grouping cells in the data volume according to a selected connectivity criterion (2); (c) selecting a rule (3) that characterizes stratigraphically reasonable geobodies (e.g. they cannot vertically overlap); and (d) in response to a determination that the initial geobody does not conform to the rule, segmenting the initial geobody into a plurality of fundamental geobodies via processing the data elements with an automated segmentation routine, wherein the fundamental geobodies each conform to the rule (4).

9 Claims, 14 Drawing Sheets

U.S. PATENT DOCUMENTS

| | | | |
|---|---|---|---|
| 5,018,112 A | 5/1991 | Pinkerton et al. |
| 5,040,414 A | 8/1991 | Graebner |
| 5,153,858 A | 10/1992 | Hildebrand et al. |
| 5,159,833 A | 11/1992 | Graebner et al. |
| 5,251,184 A | 10/1993 | Hildebrand et al. |
| 5,432,751 A | 7/1995 | Hildebrand |
| 5,586,082 A | 12/1996 | Anderson et al. |
| 5,615,171 A | 3/1997 | Hildebrand |
| 5,757,663 A | 5/1998 | Lo et al. |
| 5,798,982 A | 8/1998 | He et al. |
| 5,835,882 A | 11/1998 | Vienot et al. |
| 6,012,018 A | 1/2000 | Hornbuckle |
| 6,052,650 A | 4/2000 | Assa et al. |
| 6,128,577 A | 10/2000 | Assa et al. |
| 6,246,963 B1 | 6/2001 | Cross et al. |
| 6,393,906 B1 | 5/2002 | Vityk et al. |
| 6,401,042 B1 | 6/2002 | Van Riel et al. |
| 6,514,915 B1 | 2/2003 | Beyer et al. |
| 6,549,879 B1 | 4/2003 | Cullick et al. |
| 6,618,678 B1 | 9/2003 | Van Riel |
| 6,661,000 B2 | 12/2003 | Smith et al. |
| 6,674,689 B2 | 1/2004 | Dunn et al. |
| 6,690,820 B2 | 2/2004 | Lees et al. |
| 6,735,526 B1 | 5/2004 | Meldahl et al. |
| 6,754,588 B2 | 6/2004 | Cross et al. |
| 6,810,332 B2 | 10/2004 | Harrison |
| 6,823,266 B2 | 11/2004 | Czernuszenko et al. |
| 6,826,483 B1 | 11/2004 | Anderson et al. |
| 6,912,467 B2 | 6/2005 | Schuette |
| 6,950,751 B2 | 9/2005 | Knobloch |
| 6,985,841 B2 | 1/2006 | Barroux |
| 6,987,878 B2 | 1/2006 | Lees et al. |
| 7,013,218 B2 | 3/2006 | Baker et al. |
| 7,024,021 B2 | 4/2006 | Dunn et al. |
| 7,092,824 B2 | 8/2006 | Favret et al. |
| 7,106,348 B2 | 9/2006 | Matsumoto et al. |
| 7,113,869 B2 | 9/2006 | Xue |
| 7,124,030 B2 | 10/2006 | Ellis |
| 7,174,254 B2 | 2/2007 | Ellis |
| 7,188,092 B2 | 3/2007 | Wentland et al. |
| 7,210,342 B1 | 5/2007 | Sterner et al. |
| 7,249,009 B2 | 7/2007 | Ferworn et al. |
| 7,297,661 B2 | 11/2007 | Beyer et al. |
| 7,330,848 B2 * | 2/2008 | Chaudhuri et al. ............ 1/1 |
| 7,337,660 B2 | 3/2008 | Ibrahim et al. |
| 7,344,889 B2 | 3/2008 | Kelemen et al. |
| 7,387,021 B2 | 6/2008 | DiFoggio |
| 7,395,691 B2 | 7/2008 | Sterner et al. |
| 7,520,158 B2 | 4/2009 | DiFoggio |
| 7,526,418 B2 | 4/2009 | Pita et al. |
| 7,529,626 B1 | 5/2009 | Ellis |
| 7,739,089 B2 | 6/2010 | Gurpinar |
| 2002/0013687 A1 | 1/2002 | Ortoleva |
| 2002/0049575 A1 | 4/2002 | Jalali et al. |
| 2002/0067373 A1 | 6/2002 | Roe et al. |
| 2002/0099504 A1 | 7/2002 | Cross et al. |
| 2002/0120429 A1 | 8/2002 | Ortoleva |
| 2003/0200030 A1 | 10/2003 | Meldahl |
| 2004/0020642 A1 | 2/2004 | Vinegar et al. |
| 2004/0148147 A1 | 7/2004 | Martin |
| 2004/0153247 A1 | 8/2004 | Czernuszenko et al. |
| 2004/0210547 A1 | 10/2004 | Wentland et al. |
| 2004/0220790 A1 | 11/2004 | Cullick et al. |
| 2004/0254734 A1 | 12/2004 | Zabalza-Mezghani et al. |
| 2005/0096893 A1 | 5/2005 | Feraille et al. |
| 2005/0111732 A1 | 5/2005 | Mallya et al. |
| 2005/0149307 A1 | 7/2005 | Gurpinar et al. |
| 2005/0171700 A1 | 8/2005 | Dean |
| 2005/0199391 A1 | 9/2005 | Cudmore et al. |
| 2005/0209866 A1 | 9/2005 | Veeningen et al. |
| 2005/0209912 A1 | 9/2005 | Veeningen et al. |
| 2005/0213809 A1 | 9/2005 | Lees et al. |
| 2005/0234690 A1 | 10/2005 | Mainguy et al. |
| 2005/0256647 A1 | 11/2005 | Ellis |
| 2006/0014647 A1 | 1/2006 | Beyer et al. |
| 2006/0041409 A1 | 2/2006 | Strebelle et al. |
| 2006/0047489 A1 | 3/2006 | Scheidt et al. |
| 2006/0052938 A1 | 3/2006 | Thorne et al. |
| 2006/0092766 A1 | 5/2006 | Shelley et al. |
| 2006/0235666 A1 | 10/2006 | Assa et al. |
| 2006/0235667 A1 | 10/2006 | Fung et al. |
| 2006/0235668 A1 | 10/2006 | Swanson et al. |
| 2006/0241867 A1 | 10/2006 | Kuchuk et al. |
| 2006/0265204 A1 | 11/2006 | Wallis et al. |
| 2006/0277012 A1 | 12/2006 | Ricard et al. |
| 2006/0277013 A1 | 12/2006 | Bennis et al. |
| 2006/0282243 A1 | 12/2006 | Childs et al. |
| 2006/0287201 A1 | 12/2006 | Georgi et al. |
| 2006/0293872 A1 | 12/2006 | Zamora et al. |
| 2007/0005253 A1 | 1/2007 | Fornel et al. |
| 2007/0011646 A1 | 1/2007 | Chrisochoides et al. |
| 2007/0013690 A1 | 1/2007 | Grimaud et al. |
| 2007/0016389 A1 | 1/2007 | Ozgen |
| 2007/0027666 A1 | 2/2007 | Frankel |
| 2007/0143024 A1 | 6/2007 | Michel et al. |
| 2007/0156377 A1 | 7/2007 | Gurpinar et al. |
| 2007/0219724 A1 | 9/2007 | Li et al. |
| 2007/0219725 A1 | 9/2007 | Sun et al. |
| 2007/0234230 A1 | 10/2007 | Pedersen |
| 2007/0242564 A1 | 10/2007 | Devi |
| 2007/0265778 A1 | 11/2007 | Suter et al. |
| 2008/0040086 A1 | 2/2008 | Betancourt et al. |
| 2008/0059140 A1 | 3/2008 | Salmon et al. |
| 2008/0097735 A1 | 4/2008 | Ibrahim et al. |
| 2008/0099241 A1 | 5/2008 | Ibrahim et al. |
| 2008/0147326 A1 | 6/2008 | Ellis |
| 2008/0173804 A1 | 7/2008 | Indo et al. |
| 2009/0071239 A1 | 3/2009 | Rojas et al. |
| 2009/0204377 A1 | 8/2009 | Wagoner et al. |
| 2010/0155078 A1 | 6/2010 | Walters et al. |

FOREIGN PATENT DOCUMENTS

| | | |
|---|---|---|
| WO | WO 2006/127151 | 11/2006 |
| WO | WO 2007/007210 | 1/2007 |
| WO | WO 2007/063442 | 6/2007 |
| WO | WO 2007/106244 | 9/2007 |
| WO | WO 2008/100614 | 8/2008 |
| WO | WO 2009/079123 | 6/2009 |
| WO | WO 2009/082563 | 7/2009 |
| WO | WO 2009/094064 | 7/2009 |
| WO | WO 2009/114211 | 9/2009 |
| WO | WO 2010/008647 | 1/2010 |

OTHER PUBLICATIONS

Allen, J.R.L., (1978), "Studies in Fluviatile Sedimentation; An Exploratory Quantitative Model For The Architecture Of Avulsion-Controlled Alluvial Sites," *Sedimentary Geology*, v. 21(2), pp. 129-147.

Barton, M., et al., (2004), "Understanding Hydrocarbon Recovery In Deepwater Reservoirs; Modeling Outcrop Data In The Third Dimension," *AAPG*, v. 13, pp. 11.

Dijkstra, E.W. (1959), "A Note On Two Problem in Connection with Graphs", *Numerische Mathematic* 1, pp. 269-271.

Elshahawi, H., et al., (2000) "Correcting for Wettability and Capillary Pressure Effects On Formation Tester," SPE 63075.

Firoozabadi, A., et al. (1998), "Surface Tension of Water-Hydrocarbon Systems At Reservoir Conditions," *J. of Canadian Petro. Tech., Reservoir Engineering*, v. 41, 8 pgs.

Fowler, J. et al. (2000), "Simultaneous Inversion of the Ladybug prospect and derivation of a lithotype volume", 2000 SEG Expanded Abstracts, 3 pgs.

Gainski, M. et al., (2008) "The Schiehallion Field: Detection Of Reservoir Compartmentalisation and Identification Of New Infill Targets Using 4D Seismic Surveys and Dynamic Production Data, Reservoir Compartmentalization", [Online], pp. 32. Retrieved from the Internet: URL:http//www.geolsoc.org.uk/webdav/site/GSL/shared/pdfs/events/abstracts/Reservoir_AbstractBook.pdf.

James, W.R. et al. (2004), "Fault-Seal Analysis Using A Stochastic Multi-Fault Approach," *AAPG Bulletin*, v. 88(7), pp. 885-904.

Justwan, H., et al., "Characterization Of Static and Dynamic Reservoir Connectivity For The Ringhorne Field, Through Integration Of Geochemical and Engineering Data," Reservoir Compartmentalization, 1 pg.

Justwan, H.K., et al. (2008), "Unraveling Dynamic Fluid Connectivity Through Time-Lapse Geochemistry—From Example From the Ringhorne Field, Norway," AAPG Int'l Conf and Exhibition, Cape Town, South Africa 2008.

King, P.R. (1990), "The Connectivity And Conductivity Of Overlapping Sand Bodies," The Norwegian Institute of Technology (Graham & Trotman), pp. 353-362.

Larue, D.K., et al. (2006), "Connectivity Of Channelized Reservoirs: A Modeling Approach," *Petro. Geoscience*, v. 12, pp. 291-308.

Lescoffit, G.,et al. (2005), "Quantifying The Impact Of Fault Modeling Parameters On Production Forecasting For Clastic Reservoirs," *AAPG Hedberg Series*, No. 2, pp. 137-149.

McCain, W.D., Jr. (1991), "Reservoir-Fluid Property Correlations—State Of The Art," *SPERE*, p. 266.

Manzocchi, T., et al. (2008), "Sensitivity Of The Impact Of Geological Uncertainty On Production From Faulted And Unfaulted Shallow-Marine Oil Reservoirs: Objectives And Methods," *Petro. Geoscience*, v. 14, pp. 3-15.

Richards, B., et al. (2008), "Reservoir Connectivity Analysis Of A Complex Combination Trap Terra Nova Field, Jeanne d'Arc Basin, Newfoundland, Canada," Reservoir Compartmentalization, London Geological Society, p. 59.

Sales, J.K. (1997), "Seal Strength vs. Trap Closure; A Fundamental Control On The Distribution Of Oil And Gas, In: Seals, Traps, And The Petroleum System," *AAPG*, v. 67, pp. 57-83.

Schlumberger (2004), "Managing Uncertainty In Oilfield Reserves," *Middle East Well Evaluation Review*, v. 12, 11 pgs.

Sethian, J.A. (1996), "Level set methods and fast marching methods", Cambridge University Press, pp. 284-286.

Snedden, J.W., et al. (2007), "Reservoir Connectivity: Definitions, Examples And Strategies," IPTC 11375, Int'l. Petro. Tech. Conf., Dubai, UAE, Dec. 4-6, 2007, 6 pgs.

Stright, L. (2005), "Modeling, Upscaling and History Matching Thin, Irregularly-Shaped Flow Barriers: A Comprehensive Approach for Predicting Reservoir Connectivity," 2005 SPE Annual Tech. Conf. & Exh., Oct. 24-27, 2005, 8 pgs.

Sumpter, L., et al. (2008), "Early Recognition Of Potential Reservoir Compartmentalization," Reservoir Compartmentalization, London Geological Society, Mar. 5-6, 2008, p. 84.

Sweet, M.L., et al. (2007), "Genesis Field, Gulf Of Mexico: Recognizing Reservoir Compartments On Geologic And Production Timescales In Deep-Water Reservoirs," *AAPG*, v. 91, pp. 1701-1729.

Vrolijk, P.J., et al. (2005), "Reservoir Connectivity Analysis—Defining Reservoir Connections And Plumbing," SPE 93577, 23 pgs.

*International Search report and Written Opinion*, dated Mar. 13, 2009, PCT/US2009/031578.

Hart, Peter E., Nilsson, Nils J., Raphael, Bertram, A Formal Basis For The Heuristic Determination Of Minimum Cost Paths, Jul. 1968, IEEE Transactions of Systems Science And Cybernetics, vol. SSC-4, No. 2, pp. 100-107.

Hart, Peter E., Nilsson, Nils J., Raphael, Bertram, Correction to A Formal Basis For The Heuristic Determination Of Minimum Cost Paths, 1971, McGraw-Hill Book Co., pp. 28-29.

Chopar, Satinder, and Marfurt, Kurt, Seismic Attributes—A Promising Aid For Geologic Prediction, 2006, CSEG Recorder, pp. 110-121.

\* cited by examiner

US 8,370,122 B2

METHOD OF PREDICTING CONNECTIVITY BETWEEN PARTS OF A POTENTIAL HYDROCARBON RESERVOIR AND ANALYZING 3D DATA IN A SUBSURFACE REGION

CROSS-REFERENCE TO RELATED APPLICATION

This application is the National Stage entry under 35 U.S.C. 371 of PCT/US2008/083413 that published as WO2009/082563 and was filed on 13 Nov. 2008, which claims the benefit of U.S. Provisional Patent Application 61/008,757 filed Dec. 21, 2007 entitled METHOD AND APPARATUS FOR ANALYZING THREE-DIMENSIONAL DATA, each of which is incorporated by reference, in its entirety, for all purposes.

FIELD OF INVENTION

The following relates generally to analyzing and interpreting three-dimensional data in connection with seismic prospecting for petroleum, and more specifically to segmentation of complex three-dimensional bodies arising from seed detection in a data volume.

BRIEF DESCRIPTION OF THE DRAWINGS

FIG. 3, are illustrations depicting certain steps or aspects of an exemplary embodiment of the process of FIG. 2.

Figure 1:
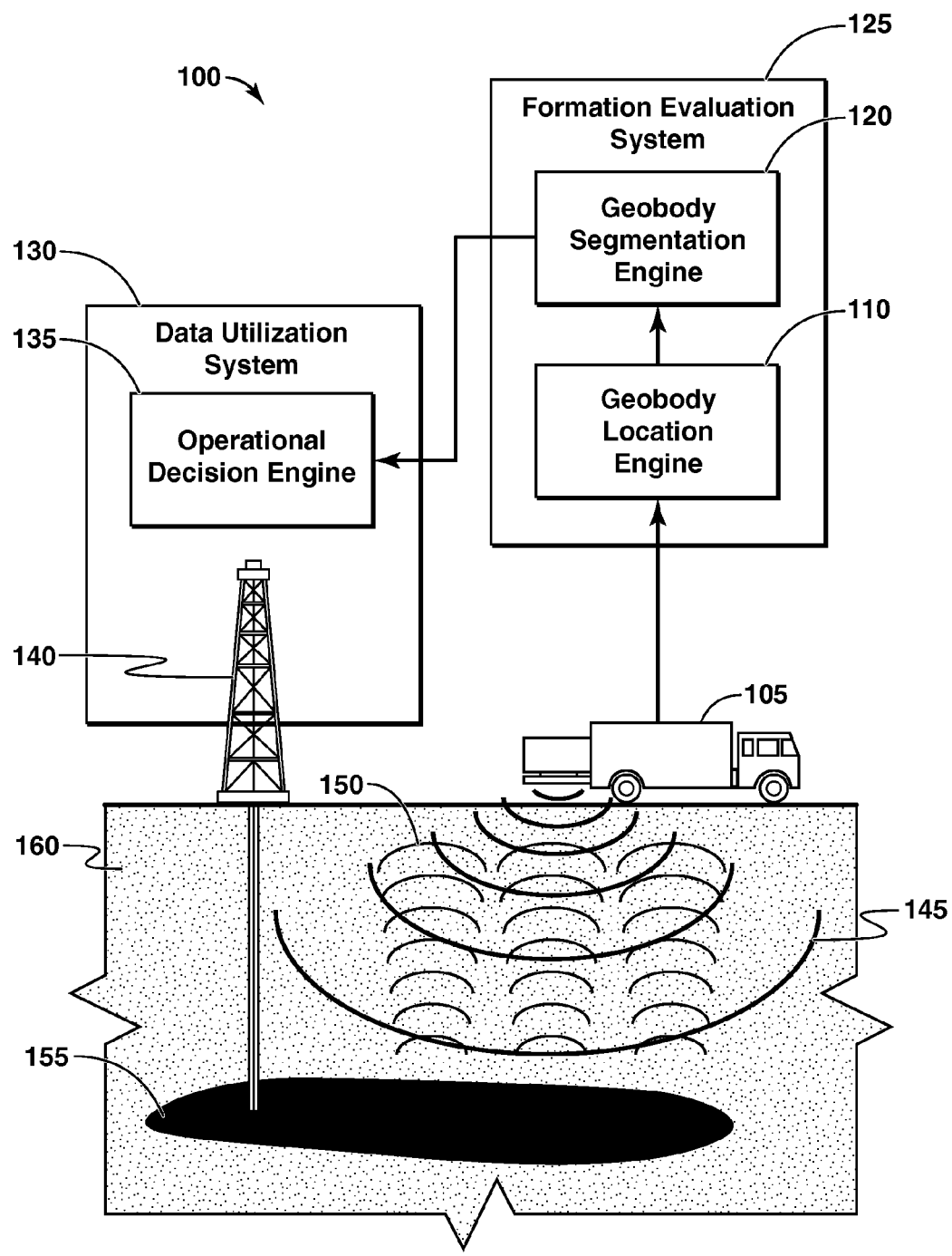
FIG. 1 is a functional block diagram of an exemplary embodiment of a system for acquiring geological information from a three-dimensional ("3D") seismic survey, identifying and segmenting geobodies in the acquired information, and beneficially managing a petroleum operation.

The elements and features shown in the drawings are not to scale, emphasis instead being placed upon clearly illustrating the principles of exemplary embodiments. Moreover, certain dimensions may be exaggerated to help visually convey such principles. In the drawings, reference numerals designate like or corresponding, but not necessarily identical, elements throughout the several views.

SUMMARY OF THE INVENTION

In another general aspect, an oil and gas prospecting method for predicting connectedness between parts of a potential hydrocarbon reservoir identified in a geophysical data volume corresponding to a subsurface region includes obtaining a plurality of data elements, respectively corresponding to three-dimensional locations in the subsurface region, and generating a data volume consisting of discrete cells from the plurality of data elements; identifying an initial geobody corresponding to a potential hydrocarbon reservoir within the data volume by grouping cells in the data volume according to a selected connectivity criterion; selecting a rule that characterizes stratigraphically reasonable geobodies; in response to a determination that the initial geobody does not conform to the rule, segmenting the initial geobody into a plurality of fundamental geobodies via processing the data elements with an automated segmentation routine, wherein the fundamental geobodies each conform to the rule; and using the fundamental geobodies to predict connectedness between parts of the potential hydrocarbon reservoir.

Implementations of this aspect may include one or more of the following features. For example, the geophysical data may include seismic data and/or seismic attribute data. After a determination that the initial geobody does not conform to the rule but before segmenting: a threshold considered to approximate noise levels in the data may be selected, then the cells that are responsible for the initial geobody's nonconformance to the selected rule are identified, then the initial geobody is adjusted by removing any such cells having data values below the selected noise-related threshold, then the determination of whether the initial geobody, after said adjustment, conforms to the rule is repeated.

The rule may be a lateral bifurcation criterion, whereby a criterion is selected limiting geobody branching in a horizontal dimension. The rule may be a law of superposition, limiting the extent to which a geobody may overlap itself in the vertical dimension, wherein two cells in a geobody are considered to overlap if they have the same horizontal coordinates and are separated vertically by at least one cell not in the geobody. The automated segmentation routine may use a shortest path search algorithm. The initial geobody may be segmented into a plurality of fundamental geobodies by (i) identifying all zones of overlapping cells within the initial geobody; (ii) identifying all cells within the potential geobody where overlap is generated by vertical branching, and designating such cells as barrier cells for shortest path searches in subsequent steps; (iii) for each pair of cells lying one each in overlapping zones, using a shortest path search algorithm to find the shortest path between the pair of cells, and finding the cell of steepest slope for each shortest path and designating it as a barrier cell; (iv) repeating step (iii), observing barrier cells, until there are no longer any paths between any overlapping zones; and (v) segmenting the initial geobody into two or more fundamental geobodies using the designated barrier cells as boundaries. The shortest path search algorithm may be the A* algorithm. The automated segmentation routine may use a 3D network of boundaries developed by performing statistical clustering analysis on the initial geobody. The automated segmentation routine may use a shortest path search algorithm to find shortest paths between pairs of at least partially overlapping clusters within the initial geobody. The geophysical data may be seismic data or seismic attribute data, and the initial geobody may be segmented into a plurality of fundamental geobodies by clustering cells in the potential geobody based on positional data or seismic attribute data or a combination thereof, forming a plurality of non-overlapping clusters which are identified as fundamental geobodies. The initial geobody may be segmented into a plurality of fundamental geobodies by (i) performing statistical clustering using one or more selected spatial or attribute criteria until no individual cluster violates the selected rule for stratigraphic reasonableness; (ii) identifying number and spatial locations of all clusters using one or more selected connectivity criteria; (iii) detecting all possible pairs of clusters that do not conform to the selected rule for stratigraphical reasonableness; (iv) selecting a pair of clusters that do not conform to the rule and applying an A* shortest path algorithm to identify a shortest path between the selected pair of clusters; (v) identifying a location of maximum change where the shortest path crosses a boundary between adjacent clusters and designating all cells having the same horizontal coordinates as that location as a barrier cell set throughout the thickness of the initial geobody; (vi) repeating steps (iv) and (v) until there are no longer any possible paths between the selected pair of clusters; (vii) repeating steps (iii) through (vi) until there are no longer any cluster pairs that violate the selected rule; and (vii) segmenting the initial geobody into two or more fundamental geobodies using the designated barrier cells. The statistical clustering analysis may include k-means clustering, hierarchical divisive clustering, and/or hierarchical agglomerative clustering. Development of the potential hydrocarbon reservoir may be planned using connectivity assumptions based on the fundamental geobodies.

In another general aspect, an oil and gas prospecting method for predicting connectedness between parts of a potential hydrocarbon reservoir identified in a geophysical data volume corresponding to a subsurface region include (a) obtaining a seismic or seismic attribute data volume of discrete cells, said data volume representing the subsurface region, and identifying an initial geobody corresponding to a potential hydrocarbon reservoir within the data volume by grouping cells in the data volume according to a selected connectivity criterion based on data changes from cell to cell; (b) in response to a determination that the initial geobody contains vertically overlapping regions, finding the shortest path between a selected pair of vertically overlapping regions; (c) breaking the shortest path at its steepest vertical gradient by creating barrier cells or by removal of cells from the initial geobody; (d) repeating (b) and (c) honoring the barriers until no path exists between the selected pair of overlapping regions; (e) repeating (b) through (d) for all remaining pairs of vertically overlapping regions; (f) segmenting the initial geobody into fundamental geobodies according to barrier cells and removed cells; and (g) using the fundamental geobodies to predict connectedness between parts of the potential hydrocarbon reservoir.

Implementations of this aspect may include one or more of the following features. For example, the shortest path may be found using the A* search algorithm.

In another general aspect, a method of producing hydrocarbons from a reservoir in a subsurface region includes (a) obtaining a seismic or seismic attribute data volume representing the subsurface region, wherein an initial geobody is identified, using an assumed connectivity criterion, as corresponding to a potential hydrocarbon reservoir, said initial geobody containing portions overlapping other portions in the vertical dimension; (b) obtaining a processed version of the data volume wherein the initial geobody is segmented into two or more fundamental, non-self-overlapping geobodies, said segmentation having been performed by steps comprising: (i) using a shortest path search algorithm, finding all possible shortest paths between portions of vertically overlapping regions in the initial geobody; (ii) breaking the shortest paths by creating barrier cells or by removal of cells from the initial geobody; (iii) segmenting the initial geobody into fundamental geobodies according to barrier cells and removed cells; (c) using the fundamental geobodies to predict connectedness between parts of the potential hydrocarbon reservoir; and (d) producing hydrocarbons from the subsurface region using the connectedness predictions to plan reservoir development.

In another general aspect, an oil and gas prospecting method for predicting connectedness between parts of a potential hydrocarbon reservoir identified in a geophysical data volume corresponding to a subsurface region includes representing the subsurface region as a plurality of voxels; associating a respective data sample with each of the plurality of voxels; identifying an initial geobody in the subsurface region via aggregating selected ones of the plurality of voxels; segmenting the initial geobody into a plurality of fundamental geobodies via hierarchical processing; and using the fundamental geobodies to predict connectedness between parts of the potential hydrocarbon reservoir.

Implementations of this aspect may include one or more of the following features. For example, segmenting the initial geobody into the plurality of fundamental geobodies bodies via hierarchical processing may include (a) initially treating each voxel as a cluster; (b) selecting a first cluster; (c) selecting a cluster distance metric; (d) determining the closest cluster to the first cluster, using the distance metric, and merging that cluster with the first cluster to form a single cluster; and (e) repeating steps (b)-(d) until all voxels belong to a single cluster.

In another general aspect, segmenting the initial geobody into the plurality of fundamental geobodies via hierarchical processing further includes recording the clusters merged at each step (d) and the distance between them as determined by the cluster distance metric. Each of the determined distances may have at least four dimensional components. Each of the determined distances may depend upon a parameter derived from a signal that has interacted with the subsurface region.

In another general aspect, an oil and gas prospecting system for predicting connectedness between parts of a potential hydrocarbon reservoir identified in a geophysical data volume corresponding to a subsurface region includes one or more hardware components and/or software components for representing the subsurface region as a plurality of voxels; for associating a respective data sample with each of the plurality of voxels; for identifying an initial geobody in the subsurface region via aggregating selected ones of the plurality of voxels; for segmenting the initial geobody into a plurality of fundamental geobodies via hierarchical processing; and for using the fundamental geobodies to predict connectedness between parts of the potential hydrocarbon reservoir.

The means for segmenting the initial geobody into the plurality of fundamental geobodies may include any combination of hardware and software for attributing a level of overlap of the initial geobody to noise. In one or more of the foregoing aspects, the selected rule is that a geobody may not overlap itself in the vertical dimension.

DETAILED DESCRIPTION OF ILLUSTRATIVE EMBODIMENTS

In the oil and gas industry, seismic prospecting techniques commonly are used to aid in the search for and evaluation of subterranean hydrocarbon deposits. A seismic prospecting operation typically proceeds in three separate stages: data acquisition, data processing, and data interpretation. Success of the prospecting operation often depends on satisfactory completion of all three stages.

In the data acquisition stage, a seismic source emits an acoustic impulse known as a "seismic signal" that propagates into the earth and is at least partially reflected by subsurface seismic reflectors (i.e., interfaces between underground formations having different acoustic impedances). The reflected signals (known as "seismic reflections") are detected and recorded by an array of seismic receivers located at or near the surface of the earth, in an overlying body of water, or at known depths in boreholes.

During the data processing stage, raw seismic data recorded in the data acquisition stage are refined and enhanced using a variety of procedures that depend on the nature of the geologic structure being investigated and on characteristics of the raw data. In general, the purpose of the data processing stage is to produce an image of the subsurface from the recorded seismic data for use during the data interpretation stage. The image is developed using theoretical and empirical models of the manner in which the seismic signals are transmitted into the earth, attenuated by subsurface strata, and reflected from geologic structures.

The purpose of the data interpretation stage is to determine information about the subsurface geology of the earth from the processed seismic data. The results of the data interpretation stage may be used to determine the general geologic structure of a subsurface region, to locate potential hydrocarbon reservoirs, to guide the development of an already discovered reservoir, or to help manage hydrocarbon extraction operations.

Often, three-dimensional seismic data is a useful tool for seismic prospecting operations. As used herein, a "three-dimensional seismic data volume" is a three-dimensional volume of discrete x-y-z or x-y-t data points, where x and y are mutually orthogonal, horizontal directions, z is the vertical direction, and t is two-way vertical seismic signal travel time. In subsurface models, these discrete data points are often represented by a set of contiguous hexahedrons known as "cells" or "voxels," with each cell or voxel representing a volume surrounding a single data point. Each data point, cell, or voxel in a three-dimensional seismic data volume typically has an assigned value ("data sample") of a specific seismic data attribute such as seismic amplitude, acoustic impedance, or any other seismic data attribute that can be defined on a point-by-point basis.

Seismic data can be represented by a seismic data trace. As used herein, a "seismic data trace" is a vertical record of a selected seismic attribute (e.g., seismic amplitude or acoustic impedance) at a single x-y (map) location. A seismic trace can be represented as a stack of cells or voxels, or by a continuous curve (known as a "wiggle trace") whose amplitudes reflect the attribute values at each z (or t) data point for the x-y location in question.

A common issue in three-dimensional seismic data interpretation concerns extraction of geologic features from a three-dimensional seismic data volume, evaluation of their geometric relationships to each other, and implications for connectivity. A "seismic object" generally is a region of connected voxels in a three-dimensional seismic data volume in which the value of a certain selected seismic attribute (acoustic impedance, for example) satisfies some arbitrary threshold requirement. For example, the number may be greater than some minimum value and/or less than some maximum value. Bulk processing of a seismic data volume at a certain attribute threshold results in the detection of one or more seismic objects (which can be "geobodies" or simply "bodies"). The seismic objects generally should correspond to actual underground reservoirs. Seismic data interpretation time could be reduced significantly via bulk processing a seismic data volume, and generating a collection of seismic objects, which represent the layered stratigraphy of the subsurface.

Identification of seismic objects (geobodies) can involve using various seismic attributes as indicators. In one exemplary embodiment, geobodies are identified by specifying a threshold attribute value. In one exemplary embodiment, geobodies are produced that are stratigraphically reasonable, for example to avoid producing geobodies that crosscut stratigraphic and structural boundaries or that have unrealistic shapes in which a geobody may overlie itself in a spiraling pattern.

The connectivity of porous and permeable hydrocarbon reservoir bodies is a control on the producibility of subsurface accumulations of oil and natural gas. Three-dimensional seismic frequently provides a key tool used by the oil and gas industry for assessment of reservoir connectivity. That tool yields volumetric images of subsurface strata using acoustic energy where each point (voxel) in the volume is characterized by its location and one or more seismic attributes such as reflectivity or impedance. Seismic volumes can be interrogated by computer-based methods to obtain subvolumes (geobodies) that are connected at some set of thresholds of a seismic attribute or set of attributes.

One technique for identifying and extracting seismic objects from a three-dimensional seismic data volume is known as "seed picking" (also known as "region growing"). Seed picking results in a set of voxels in a three-dimensional seismic data volume which fulfill user-specified attribute criteria and are connected. Seed picking has been implemented in several commercial software products such as VoxelGeo®, VoxelView®, GeoViz®, Gocad®, and others. Seed picking is an interactive method, where the user specifies the initial "seed" voxel and attribute criteria. The seed picking algorithm marks an initial voxel as belonging to the current object, and tries to find neighbors of the initial voxel that satisfy the specified attribute criteria. The new voxels are added to the current object, and the procedure continues until it is not possible to find any new neighbors fulfilling the specified criteria.

Seed picking typically involves assigning a criterion for connectivity. There are two criteria commonly used, although others may be defined and used. One definition is that two cells or voxels are connected (i.e., are neighbors) if they share a common face. By this definition of connectivity, a cell (or voxel) can have up to six neighbors. The other common criterion for being a neighbor is sharing either an edge, a face, or a corner. By this criterion, a cell (or voxel) can have up to twenty-six neighbors.

As described in U.S. Pat. No. 5,586,082 to Anderson, et al., one exemplary method of seed picking or seed growing involves determining how seismic objects that are distinct at one threshold of a chosen attribute may be connected at another threshold. For example, high amplitude regions, suggestive of petroleum presence, may be identified using seismic attribute analysis, with the object of determining oil or gas migration pathways connecting those regions, or alternatively to determine that certain regions are unconnected.

One exemplary type of seed detection method is cell connectivity-based, thus criteria for connectivity is based on cell-to-cell contact. This cell-based approach generally treats each voxel or cell as an independent measurement of the subsurface. However, the primary elements in seismic data are usually reflections composed of many vertically stacked layers of cells which form oscillations about a zero mean. Data sets that are derivatives of reflection seismic surveys may not have attributes that vary about a zero mean, but they all have internal structure that follows the layered nature of the subsurface stratigraphy. In seismic amplitude data, reflections represent acoustic discontinuities in the subsurface and are the fundamental unit used in stratigraphic and structural interpretation. In reflection-based interpretation, it is the continuity and amplitude characteristics of the reflections more than the values of the voxels that make them up that are relevant.

Commercial seed detection methods are often solely cell connectivity-based and lack adequate provisions for analysis of the resulting geobodies, which would support using seed detection and geobody identification for reservoir characterization workflows. U.S. Pat. No. 6,823,266 to Marek Czernuszenko et al. and U.S. Pat. No. 6,674,689 to Paul Dunn and Marek Czernuszenko describe methods for analyzing the connectivity and three-dimensional characteristics (shape) of geobodies extracted from three-dimensional seismic volumes. These methods allow the geoscientist to collect many geobodies into meaningful assembleges defining larger units that may control subsurface flow in hydrocarbon reservoirs. One notable use of this assemblege of geobodies is in a reservoir characterization and modeling workflow as described in U.S. Patent Application No. 60/609,057 to van Wagoner et al.

Since geobody detection and analysis is often a preliminary step in a seismic-based reservoir modeling workflow, considerable effort has been devoted to refining the process. Any inaccuracies in the initial geobody definition can propagate errors in a cascade down through the rest of the workflow.

U.S. Pat. No. 7,024,021 to Paul Dunn and Marek Czernuszenko describes a method (called StrataSeed) for including connectivity criteria beyond cell-to-cell contact through the integration of criteria that include larger scale features such as reflections or other layered structures composed of many individual cells. All seed detection algorithms, including StrataSeed, can produce stratigraphically unreasonable geobodies, although StrataSeed can be tuned to prevent self-overlapping geobodies (see below). Previous automated techniques, including StrataSeed, often produced geobodies that crosscut stratigraphic and structural boundaries and have unrealistic shapes in which a geobody may overlie itself in a spiraling pattern. A fundamental law of stratigraphy is that older strata are always overlain by younger strata (law of superposition). Bodies detected from three-dimensional seismic volumes that form spirals or self-overlapping branching shapes violate this law and can not represent the actual subsurface layering.

The generation of self-overlapping geobodies is a result of a fundamental dilemma in volumetric seed detection using attribute thresholds. Narrow thresholds tend to yield many simple, isolated bodies that may be readily interpreted in terms of the stratigraphic features they represent (e.g. channel fills, delta or deep sea fan lobes), but commonly underestimate reservoir-wide connectivity. Wide thresholds, conversely, result in selection of large numbers of voxels that form complex, self-overlapping, amorphous geobodies that are not stratigraphically reasonable and are difficult to interpret.

Technology disclosed in U.S. Pat. No. 7,024,021 (StrataSeed) can reduce the picking of unreasonable bodies and address the self-overlap issue through a map view criteria check during geobody detection. This latter constraint eliminates self-overlapping geobodies, yielding composite geobodies (groups of geobodies in contact with one and other). Composite geobodies are preferable to self-overlapped individual objects in that the component geobodies conform to the law of superposition while still being in contact with their neighbors to represent possible subsurface flow networks. A disadvantage of the method of U.S. Pat. No. 7,024,021 is that the boundaries between individual bodies are determined by the order in which the voxels are selected during bulk processing of the seismic cube and not by strictly stratigraphic criteria.

A need exists for an enhanced method for identifying and extracting connected bodies using wide thresholds of seismic attributes while still yielding stratigraphically reasonable individual geobodies that may be in contact with each other to form flow networks of permeable sand bodies. An exemplary embodiment discussed below satisfies this need for users-guided, computerized segmentation of three-dimensional bodies into stratigraphically reasonable component parts.

FIG. 1 illustrates a system 100 for acquiring geological data, evaluating the data, and utilizing the resulting evaluation to benefit a petroleum operation. The data acquisition system 105 acquires seismic data via emitting vibrations 145 into the earth and then detecting reflections 150 from formation interfaces, for example between a petroleum bearing formation 155 and another formation 160.

The data acquisition and processing system 105 provides the acquired seismic data to a formation evaluation system 125, which may be either collocated or remote. In an exemplary embodiment, the formation evaluation system 125 can include one or more computers, signal processing circuits, user interfaces, data archives, display monitors, keyboards, microprocessors, servers, etc. that are capable of executing software, code, logic, or computer-based instructions. For example, the computing engine 120 can include a computing device that executes or runs computer-implemented processes, methods, or routines.

Figures 4, 4A, 4B:
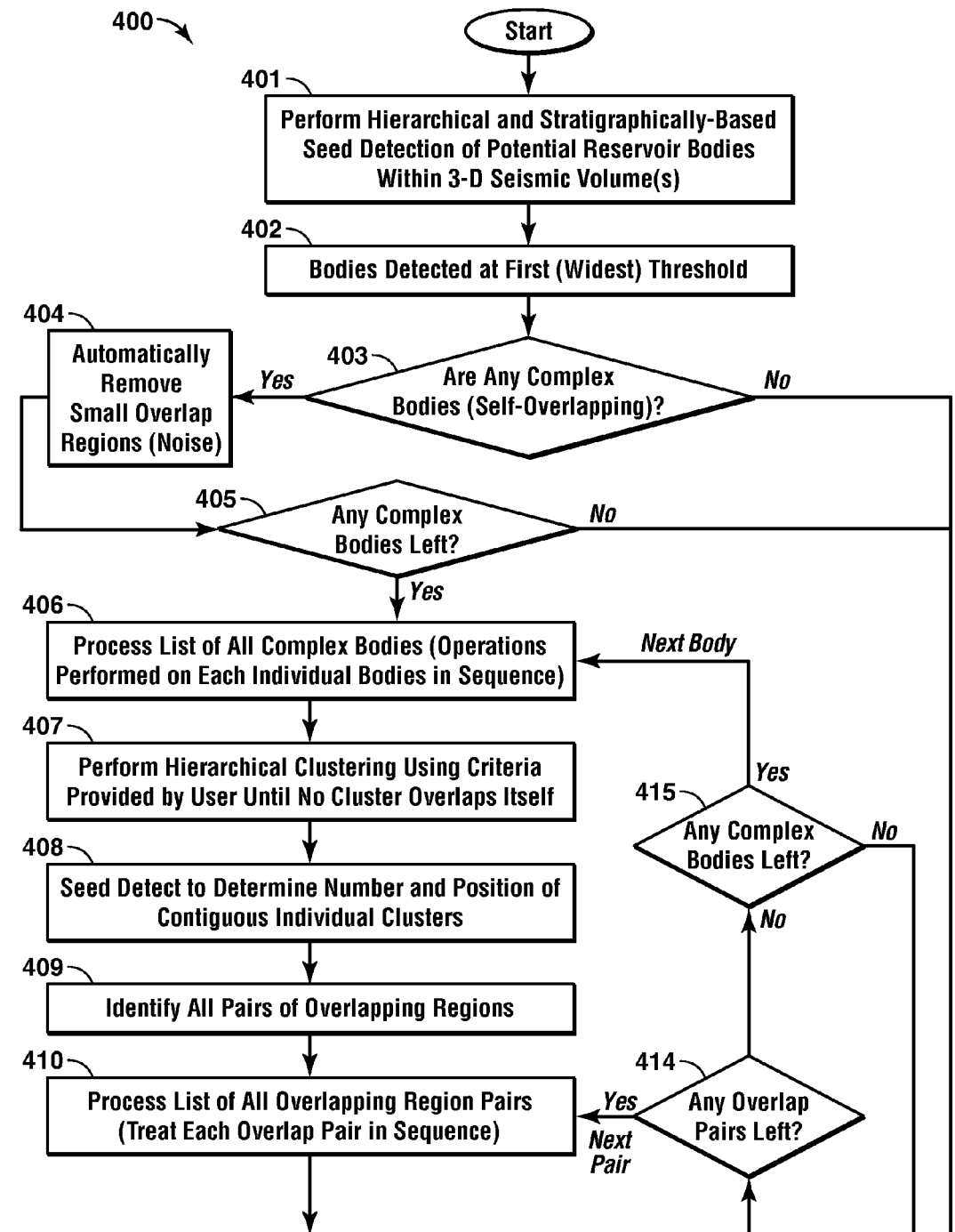
FIG. 4 is a flowchart of another exemplary embodiment of a process for segmenting geobodies extracted from three-dimensional seismic surveys.
Figures 4, 4A, 4B:
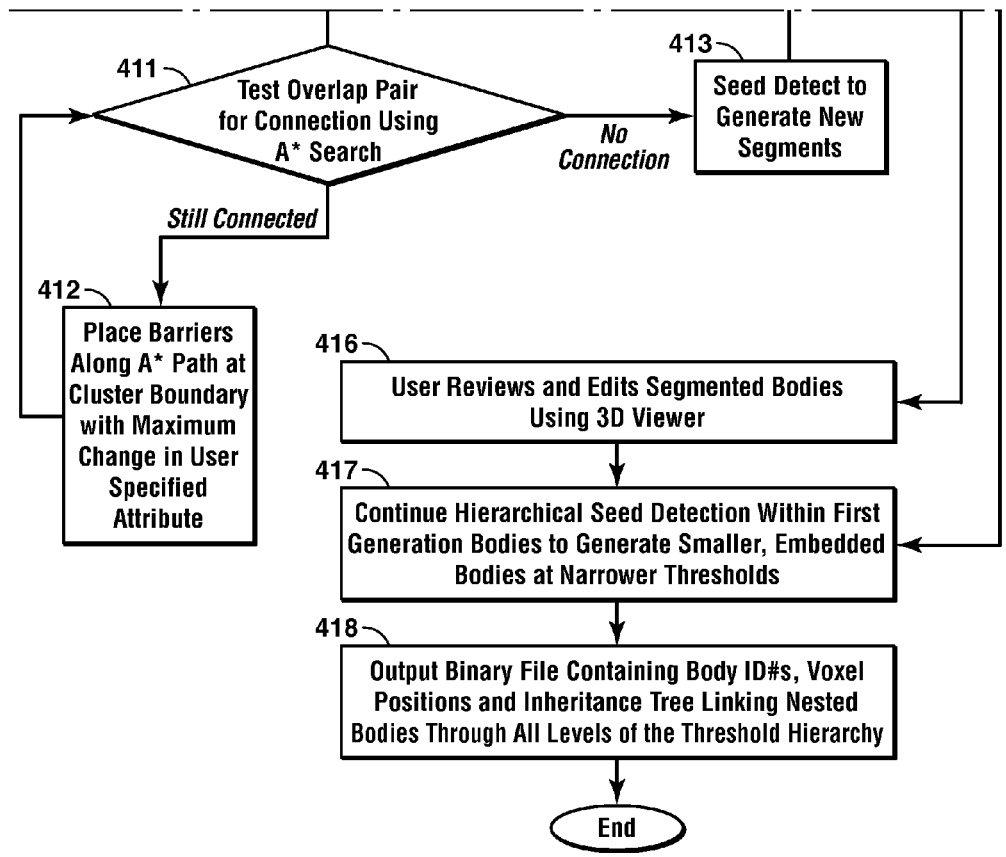

In an exemplary embodiment, the computing engine 120 can implement process 200 and/or process 400, which will be discussed in further detail below with reference to FIGS. 2 and 4 respectively. Moreover, the computing engine 120 can further execute one or more of the processes or methods discussed above. For example, the computing engine 120 can include or can run the geobody location engine 110 for identifying geobodies in the acquired seismic data. To segment the identified geobodies so that they represent actual geological structures, the geobody segmentation engine 115 can execute on the computing engine 120, for example as an exemplary embodiment of process 200 or process 400.

Based on processing by the geobody segmentation engine 115 and the formation evaluation system 125, the formation evaluation engine 125 provides geologically accurate information to the data utilization system 130. The data utilization system 130 can include computing devices, people, infrastructure, and equipment for finding petroleum, drilling, extracting petroleum, and generating profit from petroleum operations. For example, the data utilization system 130 can include an operational decision engine 135 that aids petroleum operators, engineers, and managers in making drilling decisions. Such decisions can include deciding if drilling is appropriate and determining where to place an oil well 140 based on the segmented geobodies identified by the formation evaluation engine 125. Moreover, the operational decision engine 135, in various exemplary embodiments, can support a wide range of decision making and operations management for petroleum operation or exploration. Accordingly, properly or beneficially segmenting geobodies, in accordance with an exemplary embodiment, can have a significant impact on an oil company's profit.

Figure 2A:
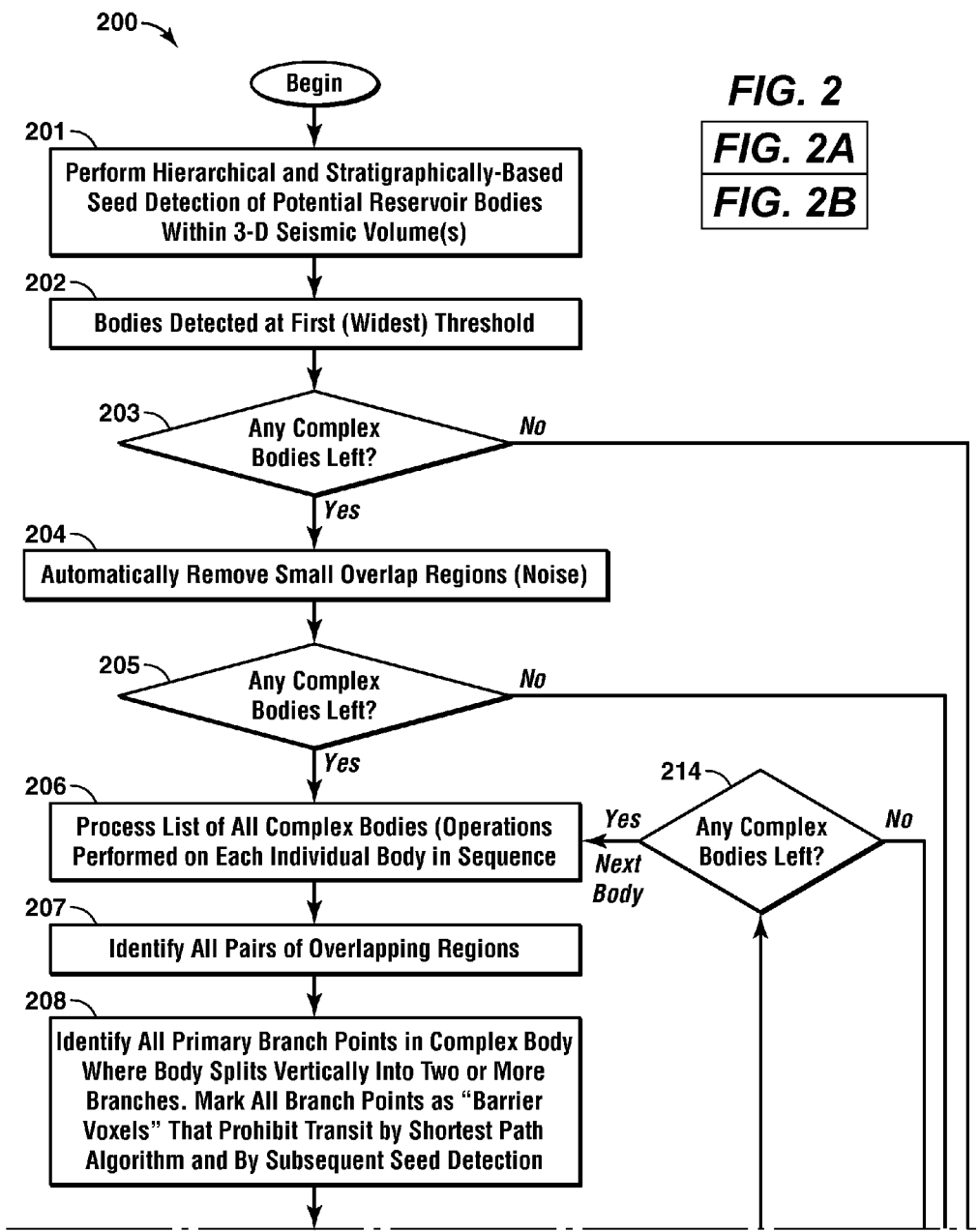
FIG. 2 is a flowchart of an exemplary embodiment of a process for segmenting geobodies extracted from three-dimensional seismic surveys.
Figures 2, 2A, 2B:
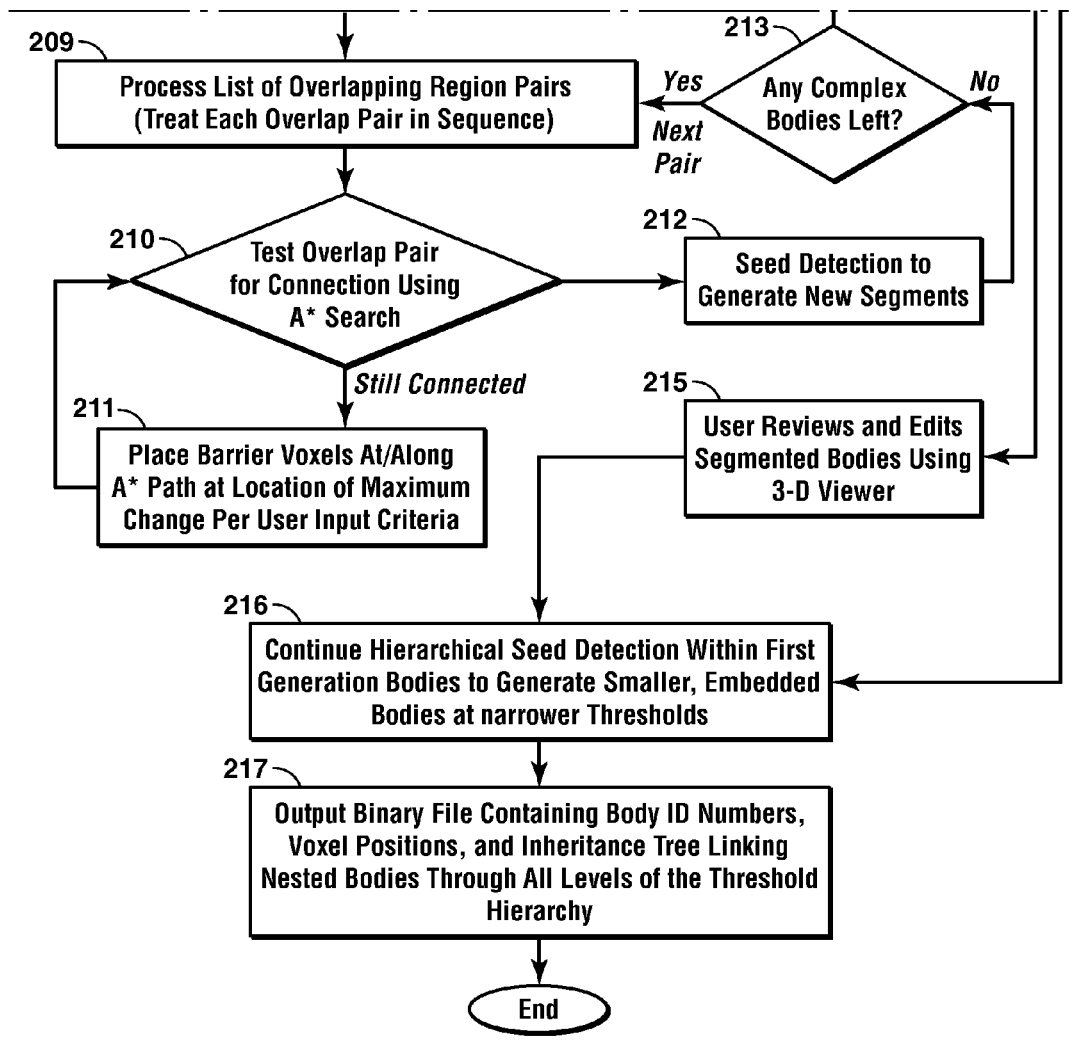
Figure 3A:
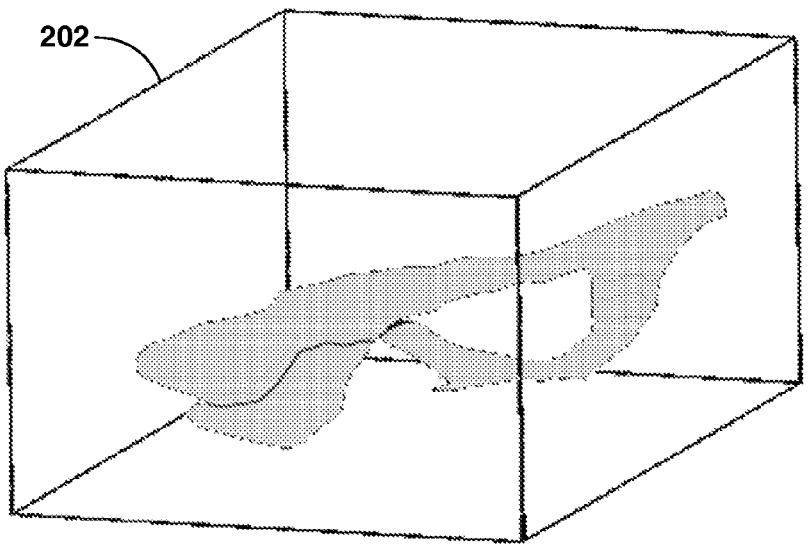
FIGS. 3A-3H, collectively
Figure 3B:
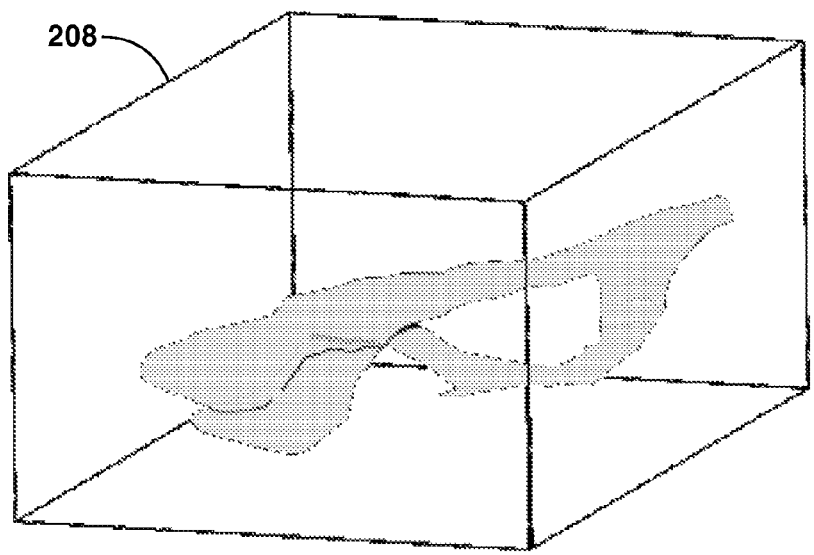
Figure 3C:
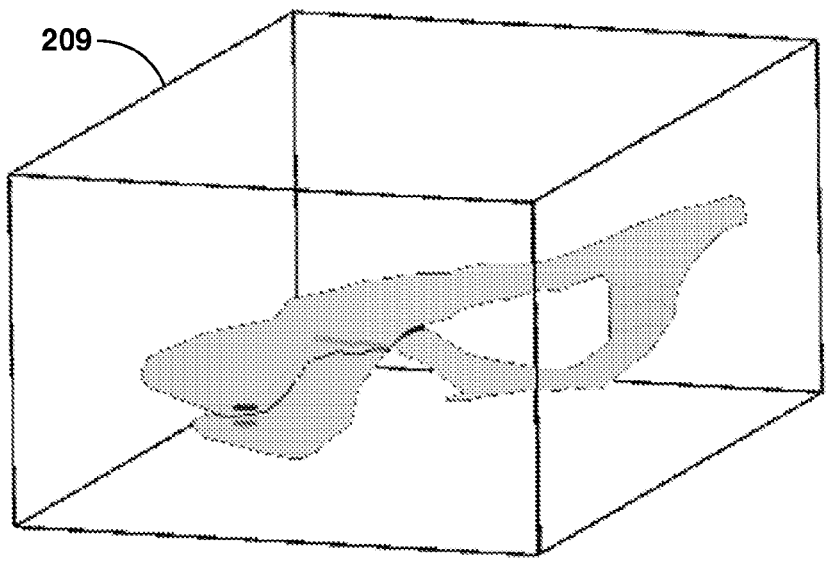
Figure 3D:
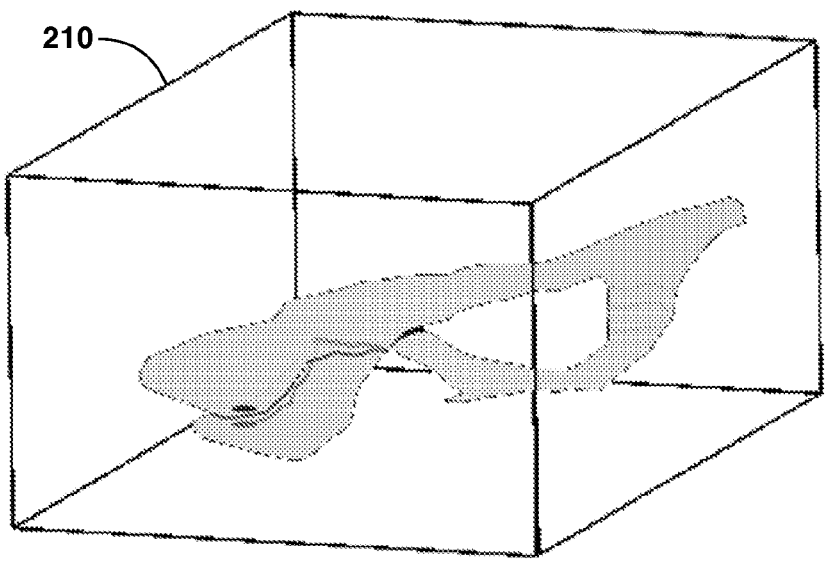
Figure 3E:
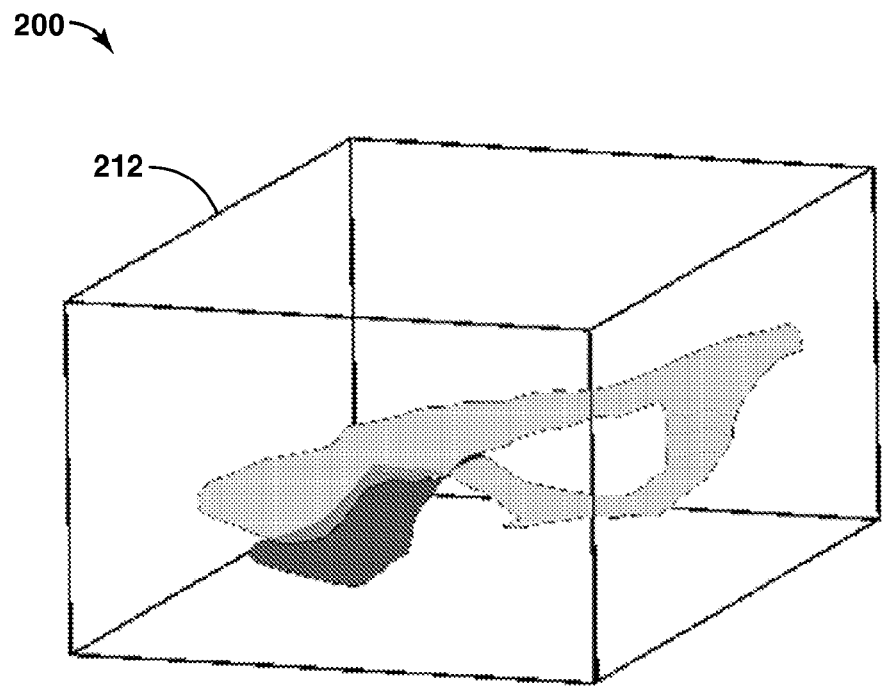
Figure 3F:
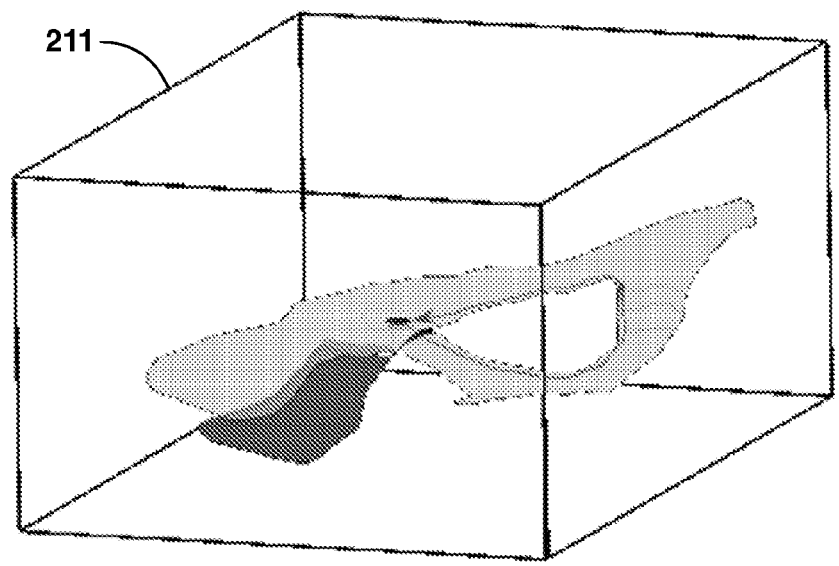
Figure 3G:
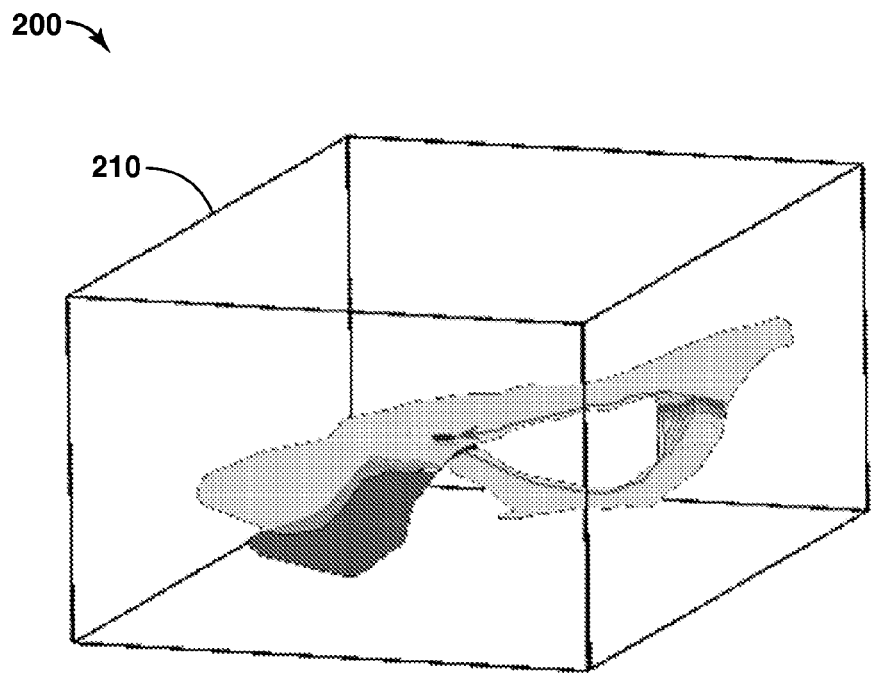
Figure 3H:
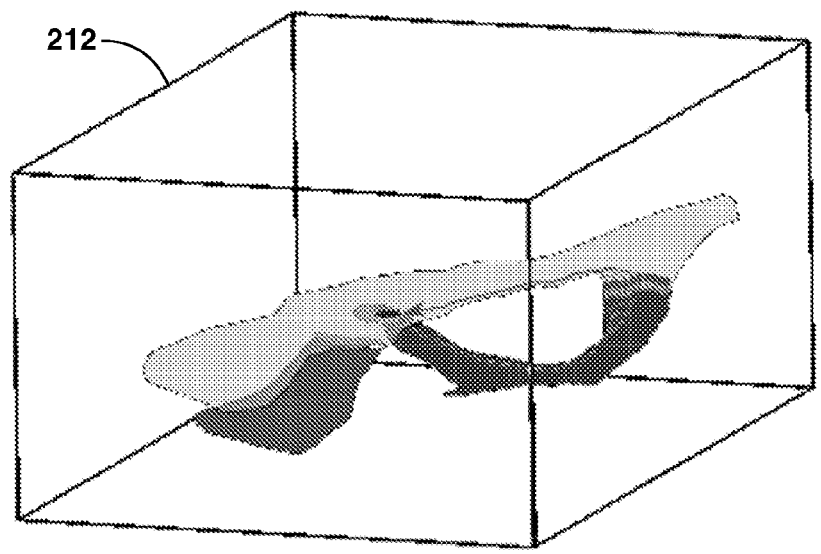

Referring to FIG. 2 and FIG. 3A-H, one exemplary embodiment uses a multi-step method 200 to segment a complex three-dimensional body using repetitive shortest path searches in which a likely segmentation point is marked on each path. Collectively, these segmentation points eventually form a "segmentation wall" along which the body will be split into two more fundamental bodies. While FIG. 2 illustrates a flowchart of the exemplary method 200, FIGS. 3A-H illustrate an exemplary application of various steps in the method 200. More specifically, FIGS. 3A-H illustrate an exemplary segmentation of a complex self-overlapping body. FIGS. 3A, 3B, 3C, 3D, and 3E depict a primary branch being segmented. Meanwhile, FIGS. 3F, 3G, and 3H illustrate segmenting a "spiral" in which overlap occurs without vertical branching. The illustrations of FIGS. 3A-3H each indicate the corresponding steps of exemplary process 200.

In an exemplary embodiment, steps 201 and 202 can involve application of stratigraphically-based seed detection, such as discussed in U.S. Pat. No. 7,024,021. FIG. 3A illustrates detecting a complex body in accordance with an exemplary embodiment of step 202.

In one exemplary embodiment, steps 201 and 202 can also include methodology described in either or both of U.S. Pat. No. 6,823,266 and U.S. Pat. No. 7,024,021, discussed above. The entire disclosures of U.S. Pat. No. 6,823,266 and U.S. Pat. No. 7,024,021 are hereby incorporated herein by reference. In an exemplary embodiment, seed detection occurs at step 201, and bodies are detected at step 202. Steps 201 and 202 can thereby define geobodies which, when selected at open attribute thresholds, may take complex forms including those that overlap themselves in spiral and branching patterns (when the map-view constraint is turned off). That is, the resulting geobodies may be unreasonable or may fail to comply with one or more validity criteria. As discussed above, a valid geobody generally should not overlap itself so as to turn back on itself with a distinct layer of material between the overlap. Such a condition indicates that the geobody should in fact be separated into two or more geobodies in order to properly reflect actual geology.

In an exemplary embodiment, in step 203, the bodies detected at the first threshold are checked to see if they vertically overlap themselves at any point. Such overlap violates the stratigraphic law of superposition which states that layers deposited on top of other deposits must be younger than the underlying strata. Testing against this law is but one example of applying a rule, a law, or a criterion to a body to evaluate whether the body is likely to appropriately represent a body actually occurring in nature. Other rules, laws, or criteria can be applied as appropriate.

In an exemplary embodiment, in steps 204 and 205, small regions of overlapping voxels that the user has deemed to be insignificant are found and deleted. Steps 204 and 205, which are optional in an exemplary embodiment, can include manual intervention from the user or automatic processing based on user input or user responses. In an exemplary embodiment, overlap associated with noise is eliminated or otherwise addressed.

In an exemplary embodiment, in step 206, a processing loop begins wherein all complex (self-overlapping) bodies are segmented sequentially or one at a time. That is, step 206 can be viewed as initiating a loop that iterates or continues until no geobody overlaps itself in a manner that would violate the stratigraphic law of superposition. In an alternative embodiment, iterative processing can eliminate some other feature or data attribute that fails to comply with a natural law, a manmade rule, or a validity criterion.

In an exemplary embodiment, all (or essentially all) zones of overlapping voxel regions are identified in step 207. In an exemplary embodiment, processing at step 208 identifies all points within the complex bodies where overlap is generated by vertical branching. The branching points are marked as "barrier voxels" that prohibit transit by the shortest path algorithm and by subsequent seed detection. Accordingly the voxel locations of these branch points are marked and are considered as barriers to all further connectivity routines. FIG. 3B illustrates detecting and "walling off" primary branch points in accordance with an exemplary embodiment of step 208.

In an exemplary embodiment, in step 209, process 200 (or a computer program embodiment thereof) enters a loop that cycles through each overlapping pair in the complex body being processed. The loop processes the list of overlapping region pairs and treats each overlap pair in sequence. FIG. 3C illustrates detecting zones of aerial overlap on branches in accordance with an exemplary embodiment of step 209.

In an exemplary embodiment, in step 210, the complex geobodies are segmented. One exemplary process for such segmentation applies the "A* search algorithm" or "A star" methodology. FIG. 3D illustrates using an A* shortest path search for linking overlapped areas as appropriate, in accordance with an exemplary embodiment of step 210 and step 211 (discussed below).

A* is an exemplary embodiment of a graph or tree routine that can identify a path between a specified initial node and a specified goal node that passes a goal test. The A* process employs a heuristic estimate that ranks nodes according to an estimate of the best path that includes each node. A* can be viewed as an exemplary embodiment of a best-first search.

Accordingly, A* is a heuristic-based graph search routine that finds the shortest path from a given initial node to a given goal node. In this case, voxels within the overlapping regions are considered as "initial nodes" if they are in the lower region and "goal nodes" when they occur in the upper region. The search is conducted from base to top for each of the overlapping region pairs.

A discussion of an exemplary A* search routine is provided in a paper by Hart et al, entitled "*A Formal Basis for the Heuristic Determination of Minimum Cost Paths*" on pages 100-107 of *IEEE Transactions on Systems Science and Cybernetics* SSC4 (2) (1968), the entire contents of which are hereby incorporated herein by reference.

Referring now to process 200 of FIG. 2, once the A* search routine finds a shortest path between two voxels in opposing overlap regions, step 211 executes. In an exemplary embodiment, in step 211, the route is inspected with a user-defined window to locate regions of steep vertical gradients. The voxel location where the shortest path makes its steepest climb or descent is marked, and future searches are prohibited from traversing that location. Thus, barrier voxels are placed along the A* path at a location of maximum change as defined by the gradient calculation. The A* routine searches iteratively through steps 210 and 211, and "barrier voxel" marking continues until there is no longer a path between the two overlapping regions. When this condition occurs, the iterating ceases and process 200 executes step 212.

In step 212, in an exemplary embodiment, the two regions are segmented by seed detection, once again using the marked voxel locations as barriers. In an exemplary embodiment, the seed detection of step 212 can proceed in accordance with the above discussion of seed detection methodologies, for example per the disclosure of U.S. Pat. No. 7,024,021, discussed above.

FIG. 3E illustrates an exemplary embodiment of step 212. As shown in FIG. 3E, if overlap areas can not be connected, then process 200 proceeds with seed detection to form a new segment.

In an exemplary embodiment, process 200 continues through steps 213 and 214, looping through each pair of overlapped regions in a particular complex geobody and then through each remaining complex geobody. In an exemplary embodiment, at step 213, an inquiry determines whether any overlapping pairs exist in the current geobody being processed. If the inquiry returns positive, step 209 executes. On the other hand, if the inquiry results in a negative determination, then step 214 executes to determine if any other complex bodies remain. If a complex body remains, then process 200 proceeds with step 206; otherwise, step 215 executes following step 214.

FIG. 3F illustrates detecting overlapped areas not on primary branches and performing the A* search via executing or iterating step 211 according to an exemplary embodiment. Meanwhile, FIG. 3G depicts continuing A* searches, as discussed above, and "wall building" so that unit overlap areas are disconnected in accordance with performing steps 210 and 211 in an exemplary embodiment. As shown in FIG. 3H, an exemplary embodiment of step 212 can proceed to seed detection and to form a new segment.

In an exemplary embodiment, the user has an opportunity in step 215 to edit the segmented complex body (now a conjoined family of fundamental bodies) within a three-dimensional viewer/editor provided by the software. This interactive step can be optional and may be omitted when the user desires to process a large number of bodies in batch mode, for example.

In an exemplary embodiment, the segmented bodies are returned to the hierarchical seed detection process in step 216 for analysis at progressively finer thresholds as set by the user. In other words, hierarchical seed detection continues within first generation bodies, resulting in the generation of smaller embedded bodies at narrower thresholds. In an exemplary embodiment, step 216 includes seed detection methodology disclosed in U.S. Pat. No. 7,024,021, as discussed above In step 217, in an exemplary embodiment, a binary file is output that contains all detected geobodies with their inheritance "tree" data structure. That is, the file contains a lineage of nested bodies that can provide a historical record of the processing that produced the final form of the geobodies. In an exemplary embodiment, process 200 ends following step 217.

In an exemplary embodiment, an oil company can drill and extract petroleum based on the results of process 200. Thus, segmenting the geobodies to match real-world geology can aid in identifying or assessing a petroleum reservoir, determining a preferred approach to drilling, optimally extracting oil, completing oil wells, and/or operating a petroleum field or business in a financially profitable manner. Operational decisions that can benefit from accurate segmentation can include determining how to increase yield of a well, deciding where to drill additional wells, determining extraction techniques and enhanced oil recovery, and discovering well-to-well interaction, for example.

As an alternative to the exemplary embodiment of FIGS. 2 and 3A-3H, a method for segmenting complex geobodies can include applying statistical techniques. For example, FIG. 4 illustrates a flowchart of an exemplary embodiment of a method 400 that can include performing statistical clustering on a complex geobody in order to establish a three-dimensional network of boundaries that will serve as a framework for segmentation. A software or computer-based implementation of this method 400 can provide a tool that segments geobodies based on statistical clustering of the bodies' voxels. The analysis of clustering can be accomplished using the spatial arrangement of the voxels (x-y-z), their voxel attributes, or both spatial arrangement and attributes. That is, clustering analysis can include evaluating physical positions (e.g. coordinate locations in three-dimensional space) and/or evaluating one or more parameters other than physical positions, wherein the parameters may include multiple dimensions.

Figure 11:
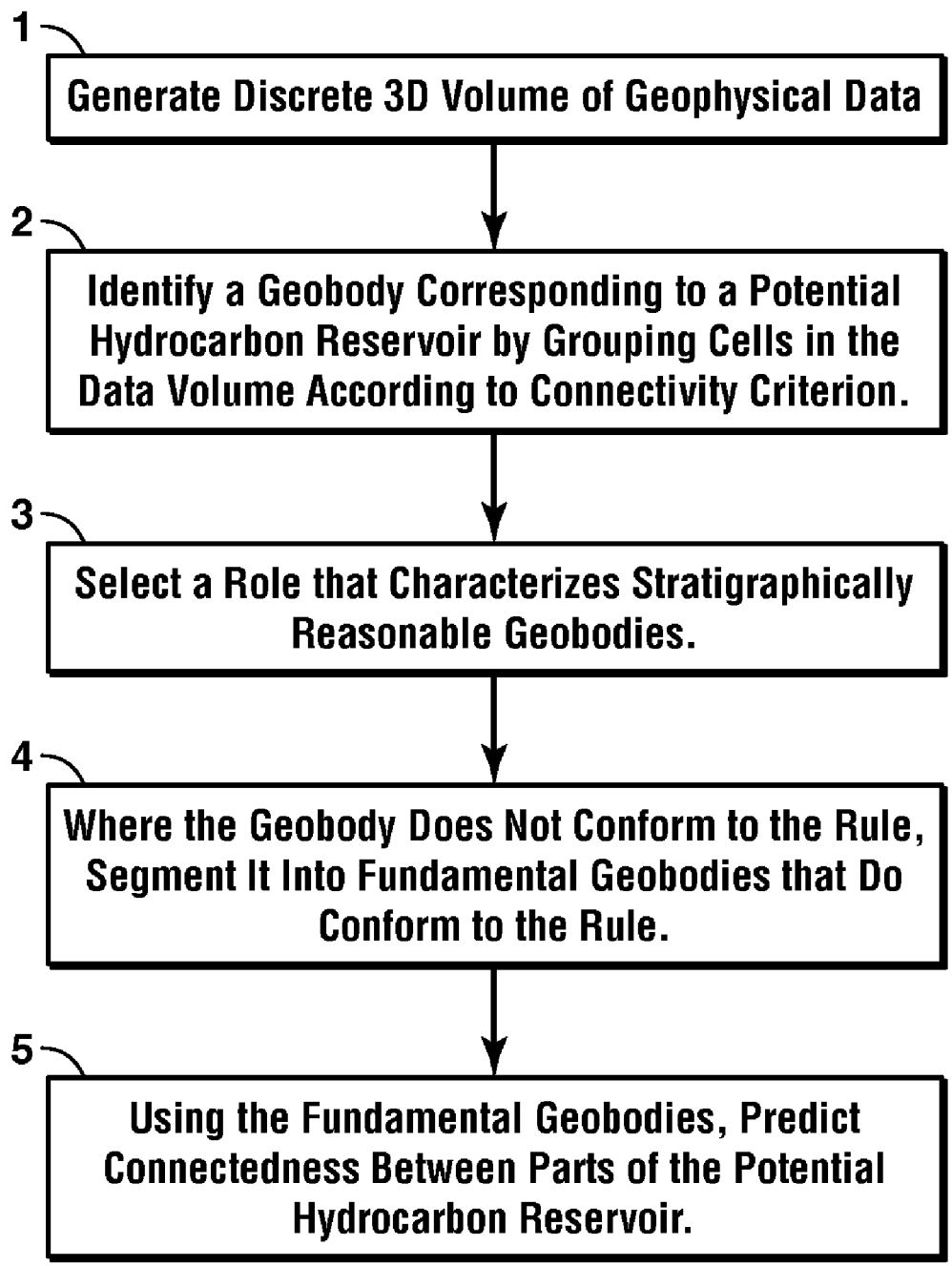
FIG. 11 is a flow chart showing basic steps in the present inventive method.

The flowchart for process 400 (depicted in FIG. 4) bears resemblance to the flowchart for process 200 (depicted in FIG. 2). (Both FIGS. 2 and 4 are much more detailed and devoted to particular embodiments than FIG. 11, which is more directed to describing the general invention.) Accordingly, the logical flow of process 400 can follow a similar flow to the flow of process 200, discussed above. However, an exemplary embodiment of process 400 omits step 218 while including several subsequent new steps, as discussed below.

In an exemplary embodiment, certain steps of process 400 can correspond to certain steps of process 200, either being similar, essentially equivalent, or approximately equal. An exemplary listing (neither limiting nor necessarily comprehensive) of various corresponding (e.g. similar) steps between process 400 and process 200 follows. In an exemplary embodiment, step 401 can correspond to or perform like step 201. In an exemplary embodiment, step 402 can correspond to or perform like step 202. In an exemplary embodiment, step 403 can correspond to or perform like step 203. In an exemplary embodiment, step 404 can correspond to or perform like step 204. In an exemplary embodiment, step 405 can correspond to or perform like step 205. In an exemplary embodiment, step 406 can correspond to or perform like step 206. In an exemplary embodiment, steps 407, 408, and 409 can collectively correspond to steps 207 and 208, with a distinction being that steps 407, 408, and 409 involve hierarchical clustering in an exemplary embodiment. Step 410 can correspond to or perform like step 209. In an exemplary embodiment, step 411 can correspond to or perform like step 210. In an exemplary embodiment, step 412 can generally correspond to step 211, with step 412 involving cluster boundaries. In an exemplary embodiment, step 413 can correspond to or perform like step 212. In an exemplary embodiment, step 414 can correspond to or perform like step 213. In an exemplary embodiment, step 415 can correspond to or perform like step 214. In an exemplary embodiment, step 416 can correspond to or perform like step 215. In an exemplary embodiment, step 417 can correspond to or perform like step 216. In an exemplary embodiment, step 418 can correspond to or perform like step 217.

In an exemplary embodiment, step 407 involves statistical clustering of all (or essential all, or most of) the voxels in the complex body being processed. The clustering analysis can be accomplished by a variety of known statistical methods. In one exemplary embodiment, the clustering analysis can include k-means processing. In one exemplary embodiment the clustering analysis can include hierarchical processing. In one exemplary embodiment, the clustering analysis can include agglomerative processing that can be a form of hierarchical processing. In one exemplary embodiment, the clustering analysis can include divisive processing that can be a form of hierarchical processing.

Figure 5:
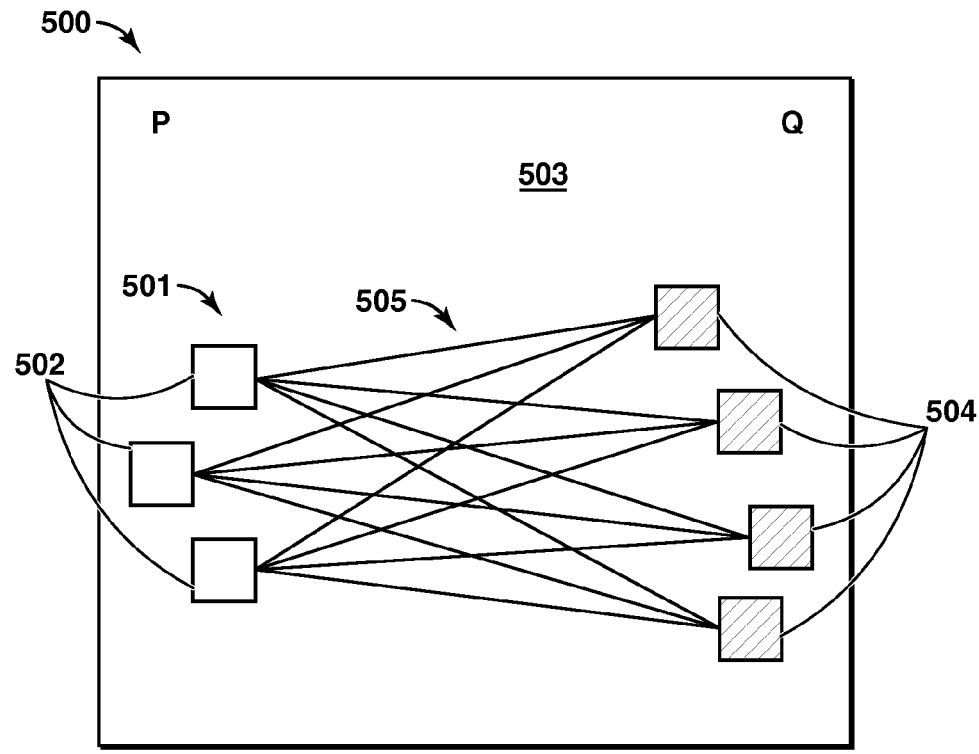
FIG. 5 is an illustration depicting certain steps or aspects of an exemplary embodiment of the process of FIG. 4.

For purposes of illustration, application of one clustering method, hierarchical agglomerative clustering ("HAC") will be described in further detail, with reference to FIGS. 5 and 6 that illustrate exemplary functions of step 407. HAC is a technique for statistical analysis in which progressively larger clusters are constructed beginning with individual data points and ending with a single large body. In the present application, an optimum, intermediate level of clustering is determined whose boundaries can be used to segment the initial body into non-overlapping regions without being overly fragmentary. The voxels can be clustered on the basis of their positional data (x-y-z) or by attribute or set of attributes (amplitude, dip, dip direction, impedance, etc.) or by any combination of positional and attribute data.

As an example, if the user wishes to cluster based on all three-dimensions, as well as dip volume values and discontinuity volume values, each voxel would conceptually have the following data structure associated with it: X, Y, Z, dip, and discontinuity. The spatial attribute X, Y and Z describe the three-dimensional position (physical location) of each voxel while dip and discontinuity are attributes that can be calculated from seismic volumes. Dip describes the angle from horizontal in the vertical plane defined by the slope of a region of voxels. Discontinuity describes the change in the statistical correlation of an attribute such as seismic amplitude between adjacent stacks of voxels. Another attribute or set of attributes can be selected by the user. Thus, clustering can proceed based on data derived from a sensor or associated with a signal in addition to data that is strictly positional.

To support performing HAC, a metric for measuring distance between voxels is defined. The Euclidean distance can be used, although there are other options. The Euclidean distance between two voxels is calculated as the square root of the sum of the squares of the difference between each datum value associated with each voxel. For our example, the Euclidean distance between voxels A and B can be calculated as:

$$\sqrt{(X_A-X_B)^2+(Y_A-Y_B)^2+(Z_A-Z_B)^2+(dip_A-dip_B)^2+(disco_A-disco_B)^2}$$

Note that this distance is not merely the spatial distance between voxels, but rather is the distance between the voxel data points in N-dimensions, where N is the number of data pieces associated with each voxel (N is 5 in this example). For this reason, it is often appropriate to normalize the voxel data prior to clustering to place each piece of data is on a like scale. The user can choose to normalize his or her data prior to clustering.

HAC also involves a metric for measuring distance between clusters made up of one or more voxels. Multiple options are available for the metric. A measurement called average linkage is being used in this example. Accordingly, the distance between two clusters is taken to be the average of the distances between their constituent voxels. That is, if cluster P 501 contains three voxels 502 and cluster Q 503 contains four voxels 504, as shown in an exemplary embodiment in the diagram 500 of FIG. 5, then twelve voxel distances 505 will be calculated, one for each distinct pair of voxels 502, 504 from cluster P 501 and cluster Q 503. The distance between clusters P and Q 501, 503 is then calculated as the average of those twelve distances 505.

Figure 6:
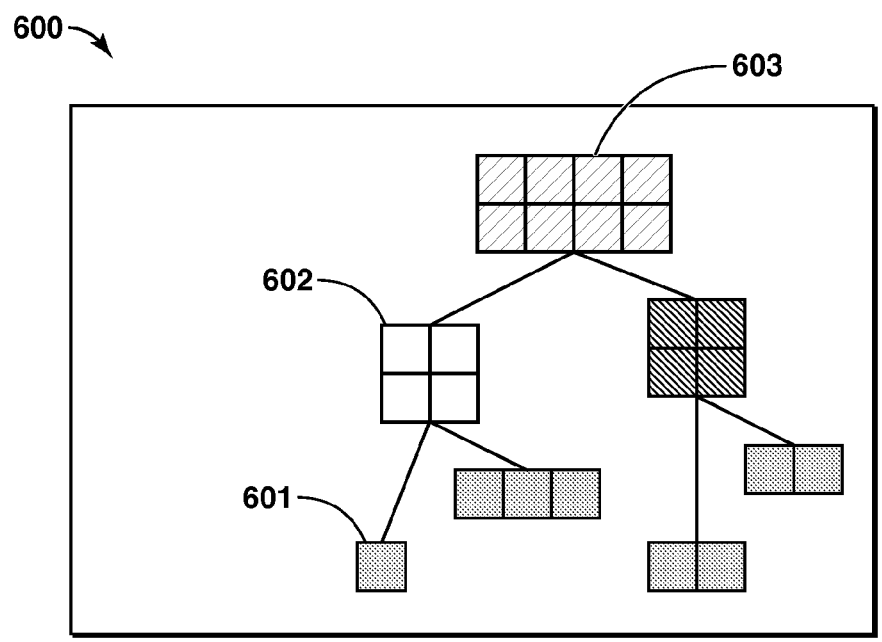
FIG. 6 is an illustration depicting certain steps or aspects of an exemplary embodiment of the process of FIG. 4.

Referring now to FIG. 6, initially, each voxel 601 is considered its own separate cluster 601. The cluster distance metric is used to locate the two clusters 602 that are closest together, which are merged into a single cluster 603. This process repeats until all voxels belong to a single master cluster 603. During clustering, a tree data structure 600 is built that records the clusters merged at each step and the distance between them. The root of the tree 600 represents the master cluster 603.

Once the HAC of step 417 (of process 400 illustrated in FIG. 4), completes, the tree of clusters is traversed down from the root to find the highest-level (i.e. largest) clusters whose voxels do not vertically overlap. These clusters are not necessarily contiguously connected in three dimensions, so seed detection is performed in each one to find the contiguous sub-clusters that make them up.

In an exemplary embodiment, in step 418, spatially distinct clusters are identified through seed detection analysis to identify contiguous individual clusters. In an exemplary embodiment, steps 411 and 412 can include using the clustered version of the complex body as input. Execution of step 411 can involve shortest path searching between pairs of overlapped regions.

Figure 7:
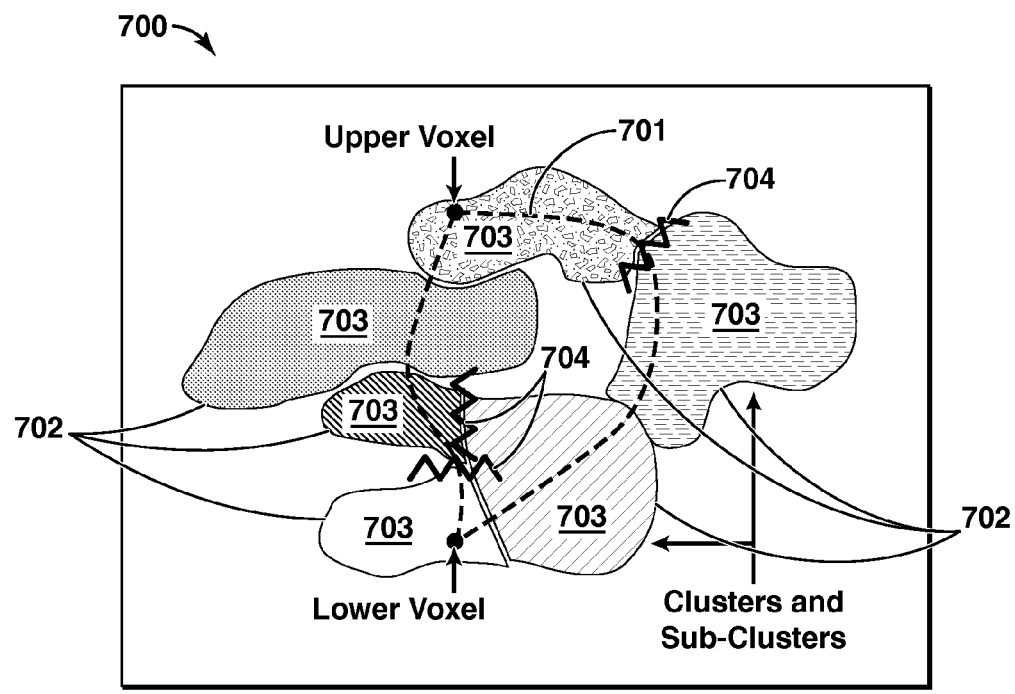
FIG. 7 is an illustration depicting segmenting geobodies in accordance with an exemplary embodiment of the process of FIG. 4.

However, as shown in the exemplary diagram 700 of FIG. 7, the specific location for body segmentation in vertical, cross section view is determined through the intersection of the shortest path 701 with the complex body cluster boundaries 702. An analysis is made along the length of the shortest path 701 comparing each pair of clusters 703 crossed, keeping track of the degree of difference in each cluster's positional and/or attribute statistics. In an exemplary embodiment, in step 412, the adjoining cluster pair boundary showing the greatest difference in one or more user selected criteria is marked as a "segmentation wall" or barrier 704. Another viable shortest path is indicated by 705. The shortest path is run repeatedly, with the search algorithm being prohibited from transiting across walls 704 formed by preceding searches, until no connection exists between the pair of overlapping regions. The complete separation of an overlap pair usually involves a composite boundary 704 formed by a connected network of cluster pair boundaries.

Figure 8:
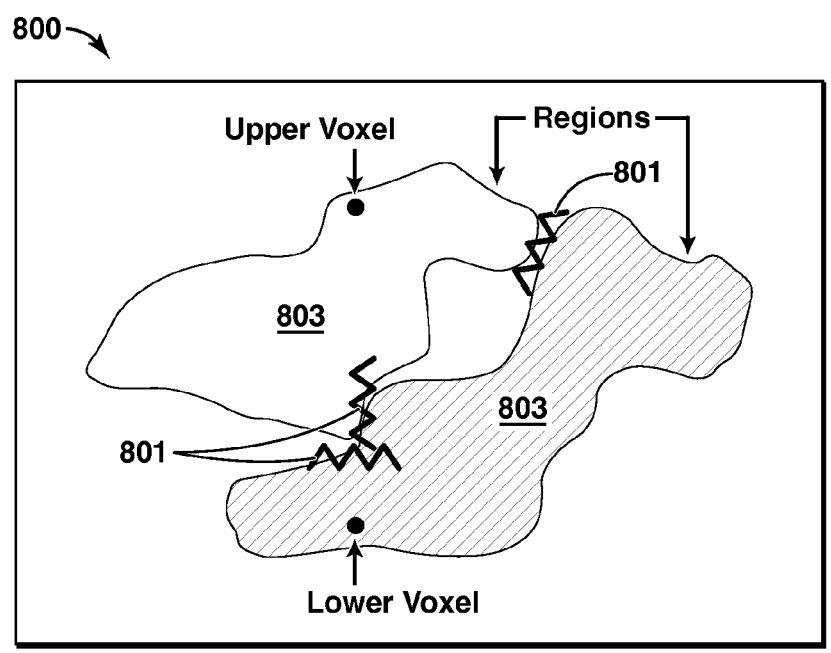
FIG. 8 is an illustration depicting segmenting geobodies in accordance with an exemplary embodiment of the process of FIG. 4.

In an exemplary embodiment, in step 413, segmentation is accomplished as discussed above via seed detection. As shown in the diagram 800 of FIG. 8, the composite boundary 801 is simplified by a routine that assigns any isolated fragments generated to the most similar (i.e. closest in terms of cluster distance as described above) cluster area as long no vertical overlap is generated. Seed-detection runs inside the original geobody using the barriers established in the previous step, separating it into at least two regions. One region contains the lower overlap voxel, and another contains the upper overlap voxel. Because of the complexity of the paths between the two regions, barriers 801 may have been inserted that break the geobody 802 into more than two pieces 803.

If any of the segmented regions still contain overlapping voxels, then a new sub-volume is created containing those voxels. That sub-volume will then be segmented using shortest-paths and barriers as described above. This continues until none of the regions overlap themselves. Subsequently, in step 414, the next overlapped region is input to the routine in an exemplary embodiment. This process continues until a determination is made at step 415 that all overlaps and complex geobodies have been segmented and no further vertical overlap exists. In an exemplary embodiment, steps 416, 417, and 418 can be essentially identical to the final three steps of process 200, discussed above.

Figure 9:
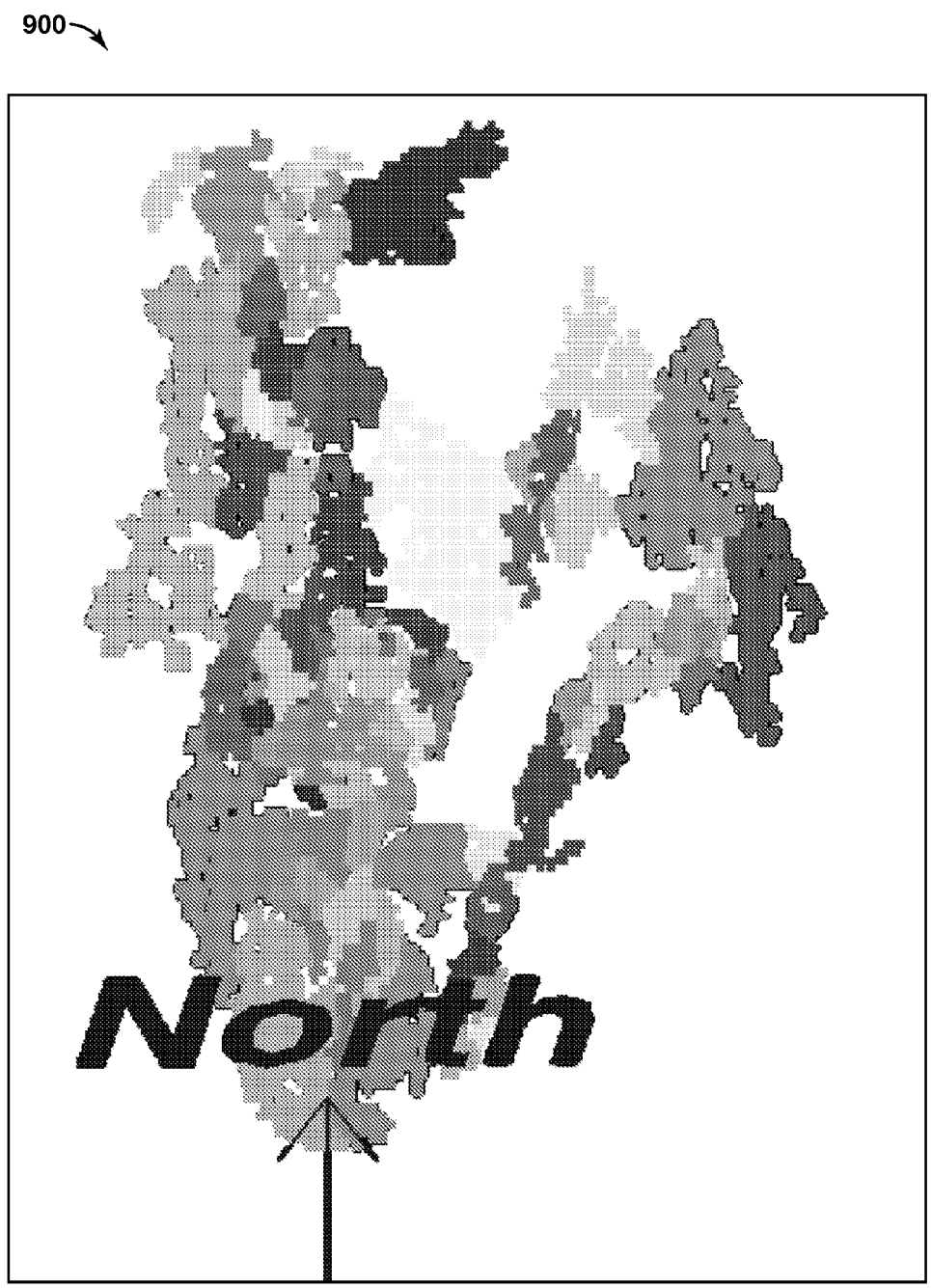
FIG. 9 is an illustration of a final segmented body resulting from an automated segmenting process in accordance with an exemplary embodiment of the process of FIG. 4.
Figure 10:
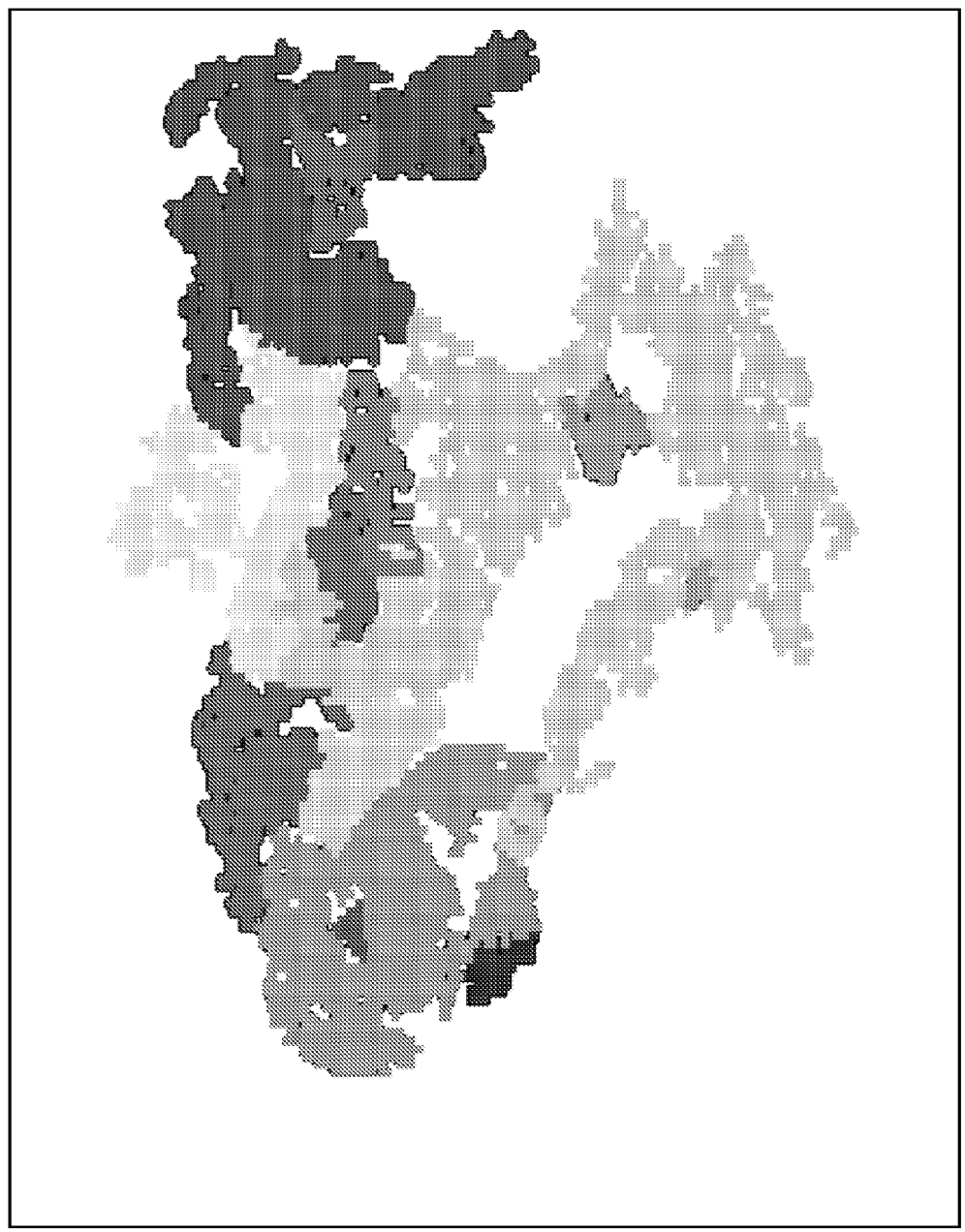
FIG. 10 is an illustration showing a complex geobody broken into non-overlapping clusters using a hierarchical clustering technique in accordance with an exemplary embodiment of the process of FIG. 4.

FIG. 9 shows a complex body extracted from a seismic cube at a single attribute threshold which was then broken into non-overlapping clusters using a hierarchical clustering technique in accordance with step 417 of process 400. FIG. 10 illustrates the final segmented body resulting from an automated segmented process in accordance with step 413 of process 400.

An oil and gas prospecting method for predicting connectedness between parts of a potential hydrocarbon reservoir identified in a geophysical data volume corresponding to a subsurface region has been described. In an exemplary embodiment, that method includes obtaining a plurality of data elements, respectively corresponding to three dimensional locations in the subsurface region, and generating a data volume consisting of discrete cells from the plurality of data elements; identifying an initial geobody corresponding to a potential hydrocarbon reservoir within the data volume by grouping cells in the data volume according to a selected connectivity criterion; selecting a rule that characterizes stratigrapically reasonable geobodies; in response to a determination that the initial geobody does not conform to the rule, segmenting the initial geobody into a plurality of fundamental geobodies via processing the data elements with an automated segmentation routine, wherein the fundamental geobodies each conform to the rule; and using the fundamental geobodies to predict connectedness between parts of the potential hydrocarbon reservoir. In an exemplary embodiment, the geophysical data are seismic data or seismic attribute data. In an exemplary embodiment, the method further includes, after a determination that the initial geobody does not conform to the rule but before segmenting: selecting a threshold considered to approximate noise levels in the data, then identifying the cells that are responsible for the initial geobody's nonconformance to the selected rule, then adjusting the initial geobody by removing any such cells having data values below the selected noise-related threshold, then repeating the determination of whether the initial geobody, after said adjustment, conforms to the rule. In an exemplary embodiment, the rule is a lateral bifurcation criterion, whereby a criterion is selected limiting geobody branching in a horizontal dimension. In an exemplary embodiment, the rule is a law of superposition, limiting the extent to which a geobody may overlap itself in the vertical dimension, wherein two cells in a geobody are considered to overlap if they have the same horizontal coordinates and are separated vertically by at least one cell not in the geobody. In an exemplary embodiment, the automated segmentation routine uses a shortest path search algorithm. In an exemplary embodiment, segmenting the initial geobody into a plurality of fundamental geobodies includes: (i) identifying all zones of overlapping cells within the initial geobody; (ii) identifying all cells within the potential geobody where overlap is generated by vertical branching, and designating such cells as barrier cells for shortest path searches in subsequent steps; (iii) for each pair of cells lying one each in overlapping zones, using a shortest path search algorithm to find the shortest path between the pair of cells, and finding the cell of steepest slope for each shortest path and designating it as a barrier cell; (iv) repeating step (iii), observing barrier cells, until there are no longer any paths between any overlapping zones; and (v) segmenting the initial geobody into two or more fundamental geobodies using the designated barrier cells as boundaries. In an exemplary embodiment, the shortest path search algorithm is the A* algorithm. In an exemplary embodiment, the automated segmentation routine uses a 3D network of boundaries developed by performing statistical clustering analysis on the initial geobody. In an exemplary embodiment, the automated segmentation routine uses a shortest path search algorithm to find shortest paths between pairs of at least partially overlapping clusters within the initial geobody. In an exemplary embodiment, the geophysical data are seismic data or seismic attribute data, and segmenting the initial geobody into a plurality of fundamental geobodies includes: clustering cells in the potential geobody based on positional data or seismic attribute data or a combination thereof, forming a plurality of non-overlapping clusters which are identified as fundamental geobodies. In an exemplary embodiment, segmenting the initial geobody into a plurality of fundamental geobodies further includes: (i) performing statistical clustering using one or more selected spatial or attribute criteria until no individual cluster violates the selected rule for stratigraphic reasonableness; (ii) identifying number and spatial locations of all clusters using one or more selected connectivity criteria; (iii) detecting all possible pairs of clusters that do not conform to the selected rule for stratigraphical reasonableness; (iv) selecting a pair of clusters that do not conform to the rule and applying an A* shortest path algorithm to identify a shortest path between the selected pair of clusters; (v) identifying a location of maximum change where the shortest path crosses a boundary between adjacent clusters and designating all cells having the same horizontal coordinates as that location as a barrier cell set throughout the thickness of the initial geobody; (vi) repeating steps (iv) and (v) until there are no longer any possible paths between the selected pair of clusters; (vii) repeating steps (iii) through (vi) until there are no longer any cluster pairs that violate the selected rule; and (vii) segmenting the initial geobody into two or more fundamental geobodies using the designated barrier cells. In an exemplary embodiment, the statistical clustering analysis is k-means clustering or hierarchical divisive clustering. In an exemplary embodiment, the statistical clustering analysis is hierarchical agglomerative clustering. In an exemplary embodiment, the method further includes planning development of the potential hydrocarbon reservoir using connectivity assumptions based on the fundamental geobodies.

An oil and gas prospecting method for predicting connectedness between parts of a potential hydrocarbon reservoir identified in a geophysical data volume corresponding to a subsurface region has been described. In an exemplary embodiment, the described method includes (a) obtaining a seismic or seismic attribute data volume of discrete cells, said data volume representing the subsurface region, and identifying an initial geobody corresponding to a potential hydrocarbon reservoir within the data volume by grouping cells in the data volume according to a selected connectivity criterion based on data changes from cell to cell; (b) in response to a determination that the initial geobody contains vertically overlapping regions, finding the shortest path between a selected pair of vertically overlapping regions; (c) breaking the shortest path by creating barrier cells or by removal of cells from the initial geobody; (d) repeating (b) and (c) honoring the barriers until no path exists between the selected pair of overlapping regions; (e) repeating (b) through (d) for all remaining pairs of vertically overlapping regions; (f) segmenting the initial geobody into fundamental geobodies according to barrier cells and removed cells; and (g) using the fundamental geobodies to predict connectedness between parts of the potential hydrocarbon reservoir. In an exemplary embodiment, the shortest path is found using the A* search algorithm.

A method of producing hydrocarbons from a reservoir in a subsurface region has been described that includes: (a) obtaining a seismic or seismic attribute data volume representing the subsurface region, wherein an initial geobody is identified, using an assumed connectivity criterion, as corresponding to a potential hydrocarbon reservoir, said initial geobody containing portions overlapping other portions in the vertical dimension; (b) obtaining a processed version of the data volume wherein the initial geobody is segmented into two or more fundamental, non-self-overlapping geobodies, said segmentation having been performed by steps including: (i) using a shortest path search algorithm, finding all possible shortest paths between portions of vertically overlapping regions in the initial geobody; (ii) breaking the shortest paths by creating barrier cells or by removal of cells from the initial geobody; (iii) segmenting the initial geobody into fundamental geobodies according to barrier cells and removed cells; (c) using the fundamental geobodies to predict connectedness between parts of the potential hydrocarbon reservoir; and (d) producing hydrocarbons from the subsurface region using the connectedness predictions to plan reservoir development.

An oil and gas prospecting method for predicting connectedness between parts of a potential hydrocarbon reservoir identified in a geophysical data volume corresponding to a subsurface region has been described. In an exemplary embodiment, the method includes: representing the subsurface region as a plurality of voxels; associating a respective data sample with each of the plurality of voxels; identifying an initial geobody in the subsurface region via aggregating selected ones of the plurality of voxels; segmenting the initial geobody into a plurality of fundamental geobodies via hierarchical processing; and using the fundamental geobodies to predict connectedness between parts of the potential hydrocarbon reservoir. In an exemplary embodiment, segmenting the initial geobody into the plurality of fundamental geobodies bodies via hierarchical processing includes clustering as described above in the discussion of FIG. 6. In an exemplary embodiment, segmenting the initial geobody into the plurality of fundamental geobodies via hierarchical processing further includes segmenting the initial geobody according to the determined distances. In an exemplary embodiment, each of the determined distances has at least four dimensional components (although the invention may be performed with fewer than four). In an exemplary embodiment, each of the determined distances depends upon a parameter derived from a signal that has interacted with the subsurface region. (In other embodiments of the invention, the parameter can be spatial based (not signal based) as described above.)

An oil and gas prospecting system for predicting connectedness between parts of a potential hydrocarbon reservoir identified in a geophysical data volume corresponding to a subsurface region has been described. In an exemplary embodiment, the system includes means for representing the subsurface region as a plurality of voxels; means for associating a respective data sample with each of the plurality of voxels; means for identifying an initial geobody in the subsurface region via aggregating selected ones of the plurality of voxels; means for segmenting the initial geobody into a plurality of fundamental geobodies via hierarchical processing; and means for using the fundamental geobodies to predict connectedness between parts of the potential hydrocarbon reservoir. In an exemplary embodiment, the means for segmenting the initial geobody into the plurality of fundamental geobodies includes a means for attributing a level of overlap of the initial geobody to noise.

Although illustrative embodiments have been shown and described, the foregoing contemplates a wide range of modifications, changes and substitutions. In some instances, some disclosed features may be employed without a corresponding use of the other disclosed features. In other instances, the disclosed elements will be combined or arranged based on understanding gained from this disclosure coupled with ordinary skill in the art. Moreover, from the description of exemplary embodiments, equivalents of the elements explicitly shown will suggest themselves to those of skill in the art, and ways of constructing other embodiments will appear to practitioners of the art. Accordingly, it is appropriate that the appended claims be construed broadly.

What is claimed is:

1. An oil and gas prospecting method for predicting connectedness between parts of a potential hydrocarbon reservoir identified in a geophysical data volume corresponding to a subsurface region, wherein the geophysical data are seismic data or seismic attribute data, the method comprising:

obtaining a plurality of data elements, respectively corresponding to three-dimensional locations in the subsurface region, and generating a data volume consisting of discrete cells from the plurality of data elements;

identifying an initial geobody corresponding to a potential hydrocarbon reservoir within the data volume by grouping cells in the data volume according to a selected connectivity criterion;

selecting a rule that characterizes stratigraphically reasonable geobodies, wherein the rule is a law of superposition, limiting the extent to which a geobody may overlap itself in the vertical dimension, wherein two cells in a geobody are considered to overlap if they have the same horizontal coordinates and are separated vertically by at least one cell not in the geobody;

in response to a determination that the initial geobody does not conform to the rule, segmenting the initial geobody into a plurality of fundamental geobodies via processing the data elements with an automated segmentation routine that uses a 3D network of boundaries developed by performing statistical clustering analysis on the initial geobody, wherein the segmenting includes clustering cells in the potential geobody based on positional data or seismic attribute data or a combination thereof, forming a plurality of non-overlapping clusters which are identified as fundamental geobodies, and wherein the fundamental geobodies each conform to the rule; and using the fundamental geobodies to predict connectedness between parts of the potential hydrocarbon reservoir;

wherein segmenting the initial geobody into a plurality of fundamental geobodies further comprises:

(i) performing statistical clustering using one or more selected spatial or attribute criteria until no individual cluster violates the selected rule for stratigraphic reasonableness;

(ii) identifying number and spatial locations of all clusters using one or more selected connectivity criteria;

(iii) detecting all possible pairs of clusters that do not conform to the selected rule for stratigraphical reasonableness;

(iv) selecting a pair of clusters that do not conform to the rule and applying an A* shortest path algorithm to identify a shortest path between the selected pair of clusters;

(v) identifying a location of maximum change where the shortest path crosses a boundary between adjacent clusters and designating all cells having the same horizontal coordinates as that location as a barrier cell set throughout the thickness of the initial geobody;

(vi) repeating steps (iv) and (v) until there are no longer any possible paths between the selected pair of clusters;

(vii) repeating steps (iii) through (vi) until there are no longer any cluster pairs that violate the selected rule; and (vii) segmenting the initial geobody into two or more fundamental geobodies using the designated barrier cells.

2. The method of claim 1, wherein the geophysical data are seismic data or seismic attribute data.

3. The method of claim 1, further comprising after a determination that the initial geobody does not conform to the rule but before segmenting: selecting a threshold considered to approximate noise levels in the data, then identifying the cells that are responsible for the initial geobody's nonconformance to the selected rule, then adjusting the initial geobody by removing any such cells having data values below the selected noise-related threshold, then repeating the determination of whether the initial geobody, after said adjustment, conforms to the rule.

4. The method of claim 1, wherein the rule is a lateral bifurcation criterion, whereby a criterion is selected limiting geobody branching in a horizontal dimension.

5. The method of claim 1, wherein the automated segmentation routine uses a shortest path search algorithm.

6. The method of claim 1, wherein the automated segmentation routine uses a shortest path search algorithm to find shortest paths between pairs of at least partially overlapping clusters within the initial geobody.

7. The method of claim 1, wherein the statistical clustering analysis is k-means clustering or hierarchical divisive clustering.

8. The method of claim 1, wherein the statistical clustering analysis is hierarchical agglomerative clustering.

9. The method of claim 1, further comprising planning development of the potential hydrocarbon reservoir using connectivity assumptions based on the fundamental geobodies.

* * * * *